United States Patent
Li et al.

(10) Patent No.: US 10,129,870 B2
(45) Date of Patent: Nov. 13, 2018

(54) SEPARATION OF CONTROL AND DATA SUBBANDS IN UNLICENSED SPECTRUM

(71) Applicant: QUALCOMM Incorporated, San Diego, CA (US)

(72) Inventors: Junyi Li, Chester, NJ (US); Assaf Touboul, Natanya (IL); Xinzhou Wu, Hillsborough, NJ (US); Arthur Gubeskys, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 71 days.

(21) Appl. No.: 14/842,685

(22) Filed: Sep. 1, 2015

(65) Prior Publication Data

US 2017/0064702 A1    Mar. 2, 2017

(51) Int. Cl.
  *H04B 7/00*      (2006.01)
  *H04W 72/04*     (2009.01)
  *H04W 74/08*     (2009.01)
  *H04W 16/14*     (2009.01)

(52) U.S. Cl.
  CPC ... *H04W 72/0446* (2013.01); *H04W 74/0816* (2013.01); *H04W 16/14* (2013.01)

(58) Field of Classification Search
  CPC ..... H04W 16/14; H04W 28/26; H04W 72/04; H04W 72/0453
  USPC ........ 370/310, 328, 329, 330, 343, 431, 438
  See application file for complete search history.

(56) References Cited

U.S. PATENT DOCUMENTS

| | | | |
|---|---|---|---|
| 7,440,728 B2 | 10/2008 | Abhishek et al. | |
| 7,613,138 B2 * | 11/2009 | Bahl | H04W 72/0406 370/230 |
| 7,689,186 B2 | 3/2010 | Matoba et al. | |
| 7,783,300 B2 * | 8/2010 | Sinha | H04W 12/06 455/450 |
| 8,078,111 B2 | 12/2011 | Jovicic et al. | |
| 8,179,873 B2 * | 5/2012 | Bonta | H04W 4/20 370/338 |
| 8,885,507 B2 * | 11/2014 | Chen | H04W 72/0406 370/252 |
| 9,253,799 B2 * | 2/2016 | Taori | H04W 74/0808 |
| 9,516,640 B2 * | 12/2016 | Pazhyannur | H04W 16/14 |

(Continued)

FOREIGN PATENT DOCUMENTS

WO   WO-2015038175 A1   3/2015

OTHER PUBLICATIONS

ISA/EP, International Search Report and Written Opinion of the International Searching Authority, Int'l Application No. PCT/US2016/044675, dated Oct. 10, 2016, European Patent Office, Rijswijk, NL, 11 pgs.

*Primary Examiner* — Dmitry Levitan

(74) *Attorney, Agent, or Firm* — Holland & Hart LLP/Qualcomm

(57) ABSTRACT

A wireless device may identify a first subband in an unlicensed radio frequency spectrum band used to communicate control traffic. The wireless device may identify a second subband in the unlicensed radio frequency spectrum band used to communicate data traffic. The first subband and the second subband may be different. The wireless device may reserve the first subband for a first duration of time for a plurality of wireless devices. The reservation may be based at least in part on an enhanced self-clear-to-send (self-CTS) transmitted over the first subband.

30 Claims, 19 Drawing Sheets

(56) References Cited

U.S. PATENT DOCUMENTS

| | | | |
|---|---|---|---|
| 9,781,741 B2* | 10/2017 | Kwon | H04W 72/0446 |
| 2010/0014458 A1 | 1/2010 | Singh et al. | |
| 2010/0014502 A1 | 1/2010 | Singh et al. | |
| 2012/0114134 A1 | 5/2012 | Li et al. | |
| 2014/0355557 A1* | 12/2014 | Peng | H04W 16/14 370/330 |
| 2015/0223075 A1* | 8/2015 | Bashar | H04W 16/14 370/329 |
| 2016/0021682 A1* | 1/2016 | Wang | H04W 74/04 370/329 |
| 2016/0037557 A1* | 2/2016 | Gu | H04W 74/02 370/338 |
| 2016/0044516 A1* | 2/2016 | Hedayat | H04W 16/14 370/329 |
| 2016/0066325 A1* | 3/2016 | Kim | H04W 74/0816 370/329 |
| 2016/0174078 A1* | 6/2016 | Salem | H04W 16/14 370/329 |
| 2016/0227416 A1* | 8/2016 | Suzuki | H04W 72/0453 |
| 2016/0227578 A1* | 8/2016 | Lee | H04W 74/004 |
| 2016/0337865 A1* | 11/2016 | Morioka | H04W 16/14 |
| 2017/0171884 A1* | 6/2017 | Niu | H04W 74/006 |
| 2017/0202019 A1* | 7/2017 | You | H04W 74/0808 |

\* cited by examiner

SEPARATION OF CONTROL AND DATA SUBBANDS IN UNLICENSED SPECTRUM

BACKGROUND

The following relates generally to wireless communication, and more specifically to separation of control and data subbands in unlicensed spectrum.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN) may include an access point (AP) that communicates with one or more stations (STAs) or mobile devices. The AP may be coupled to a network, such as the Internet, and may enable a mobile device to communicate via the network (or communicate with other devices coupled to the access point). A STA may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP. The uplink and downlink communications may convey information such as control traffic and data traffic.

In some wireless communications systems, control traffic and data traffic may be sent using the same frequency resources. For example, control and data may be sent over the same unlicensed subband. In such a scenario, there may be a temporal gap between uplink and downlink transmissions that provides time for associated wireless devices (e.g., APs and STAs) to prepare for the change in communication. Such gaps may result in an inefficient use of radio resources. Additionally, the data rates associated with the subband may be excessive for the amount of control traffic. In some cases, the subband used for both the control traffic and the data traffic may use data rates that are unreliable for the control traffic.

SUMMARY

A wireless device may send and receive control traffic and data traffic over two different subbands in the same unlicensed radio frequency spectrum band. The control traffic may be send over a control subband and the data traffic may be sent over a data subband. The subbands may be reserved for use by a select group of wireless devices for a particular duration of time. For example, a subband may be reserved such that wireless devices in the same network are permitted to access the subband while wireless devices outside of the network are prohibited access. In one example, a subband may be reserved by an enhanced self-CTS (clear-to-send) packet sent over the subband by a wireless device. The wireless device that reserves the subband may also participate in other types of communications over the reserved subband. Alternatively, the wireless device that reserves the subband may refrain from other types of communication over the reserved subband.

A method of wireless communication is described. The method may include identifying a first subband in an unlicensed radio frequency spectrum band used to communicate control traffic and a second subband in the unlicensed radio frequency spectrum band used to communicate data traffic, wherein the first subband and the second subband are different, and reserving the first subband for a first duration of time for a plurality of wireless devices, the reservation based at least in part on an enhanced self-clear-to-send (self-CTS) transmitted over the first subband.

An apparatus for wireless communication is described. The apparatus may include means for identifying a first subband in an unlicensed radio frequency spectrum band used to communicate control traffic and a second subband in the unlicensed radio frequency spectrum band used to communicate data traffic, wherein the first subband and the second subband are different, and means for reserving the first subband for a first duration of time for a plurality of wireless devices, the reservation based at least in part on an enhanced self-clear-to-send (self-CTS) transmitted over the first subband.

A further apparatus for wireless communication is described. The apparatus may include a processor, memory in electronic communication with the processor, and instructions stored in the memory and operable, when executed by the processor, to cause the apparatus to identify a first subband in an unlicensed radio frequency spectrum band used to communicate control traffic and a second subband in the unlicensed radio frequency spectrum band used to communicate data traffic, wherein the first subband and the second subband are different, and reserve the first subband for a first duration of time for a plurality of wireless devices, the reservation based at least in part on an enhanced self-clear-to-send (self-CTS) transmitted over the first subband.

A non-transitory computer-readable medium storing code for wireless communication is described. The code may include instructions executable to identify a first subband in an unlicensed radio frequency spectrum band used to communicate control traffic and a second subband in the unlicensed radio frequency spectrum band used to communicate data traffic, wherein the first subband and the second subband are different, and reserve the first subband for a first duration of time for a plurality of wireless devices, the reservation based at least in part on an enhanced self-clear-to-send (self-CTS) transmitted over the first subband.

Some examples of the method, apparatuses, or non-transitory computer-readable medium described herein may further include processes, features, means, or instructions for receiving data traffic over the second subband during a second duration of time, wherein the second subband is reserved for the plurality of wireless devices for the second duration of time by a second enhanced self-CTS transmitted over the second subband. Additionally or alternatively, some examples may include processes, features, means, or instructions for transmitting, over the first subband during the first duration of time, a subband assignment for the second subband, wherein the second enhanced self-CTS is based at least in part on the subband assignment.

Some examples of the method, apparatuses, or non-transitory computer-readable medium described herein may further include processes, features, means, or instructions for transmitting data traffic over the second subband during a second duration of time, wherein the second subband is reserved for the plurality of wireless devices for the second duration of time by a second enhanced self-CTS transmitted over the second subband. Additionally or alternatively, some examples may include processes, features, means, or instructions for receiving, over the first subband during the first duration of time, a subband assignment for the second subband, wherein the second enhanced self-CTS is based at least in part on the subband assignment.

Some examples of the method, apparatuses, or non-transitory computer-readable medium described herein may further include processes, features, means, or instructions for receiving control traffic over the first subband by at least one of the plurality of wireless devices during the first duration of time. Additionally or alternatively, some examples may include processes, features, means, or instructions for transmitting control traffic over the first subband by at least one of the plurality of wireless devices during the first duration of time. In some examples of the method, apparatuses, or non-transitory computer-readable medium described herein, transmitting the control traffic includes transmitting the control traffic according to a random access scheme or a pre-determined round robin time division multiple access (TDMA) scheme. Additionally or alternatively, in some examples reserving the first subband for the first duration of time for the plurality of wireless devices includes transmitting the enhanced self-CTS from a wireless device associated with control traffic transmitted over the first subband during the first duration of time.

In some examples of the method, apparatuses, or non-transitory computer-readable medium described herein, reserving the first subband for the first duration of time for the plurality of wireless devices includes transmitting the enhanced self-CTS from a central coordinator unassociated with control traffic transmitted over the first subband during the first duration of time. Additionally or alternatively, some examples may include processes, features, means, or instructions for receiving control traffic over the first subband by at least one of the plurality of wireless devices during the first duration of time, wherein the control traffic comprises at least one of a traffic request or a channel quality indicator (CQI) report.

In some examples of the method, apparatuses, or non-transitory computer-readable medium described herein, the enhanced self-CTS includes a network identifier (ID) that corresponds to a network with which the plurality of wireless devices belong. Additionally or alternatively, in some examples the first subband is lower in frequency than the second subband and comprises a smaller bandwidth than the second subband. In some examples of the method, apparatuses, or non-transitory computer-readable medium described herein, the first subband comprises a frequency that is in a sub 1 GHz range and the second subband comprises a frequency that is in a 2.4 GHz or 5 GHz band, and a bandwidth of the second subband is at least ten times larger than the first subband.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

A wireless communication system may include a control subband dedicated to control traffic and a data subband dedicated to data traffic. The control subband and the data subband may be different (separate) subbands in the same unlicensed radio frequency spectrum band. Wireless devices in the wireless communication system may identify the separate control and data subbands and reserve them for use by other wireless devices in the same network. During the reservation, wireless devices outside of the network may not be able to access the subband. A subband may be reserved by an enhanced self-clear-to-send (CTS) packet sent over the subband. The enhanced self-CTS packet may indicate the duration of time for which the subband is reserved. The enhanced self-CTS may be sent by a wireless device that participates in other types of communications over the subbands. Alternatively, the enhanced self-CTS may be sent by a wireless device that does not participate in other types of communications over the subbands. In some cases, the enhanced self-CTS includes a network identifier (ID) that indicates the network to which the transmitting wireless device belongs. A wireless device that receives the enhanced self-CTS over the subband may be permitted access to the subband during the reservation if the network ID included in the enhanced self-CTS corresponds to a network associated with the wireless device. If the network ID does not correspond to a network associated with the wireless device, the wireless device may be restricted from accessing the subband during the reservation period.

Aspects of the disclosure are initially described in the context of a wireless communication system. Specific examples are then described for separation of control and data subbands in unlicensed spectrum. These and other aspects of the disclosure are further illustrated by and described with reference to apparatus diagrams, system diagrams, and flowcharts that relate to separation of control and data subbands in unlicensed spectrum.

Figure 1:
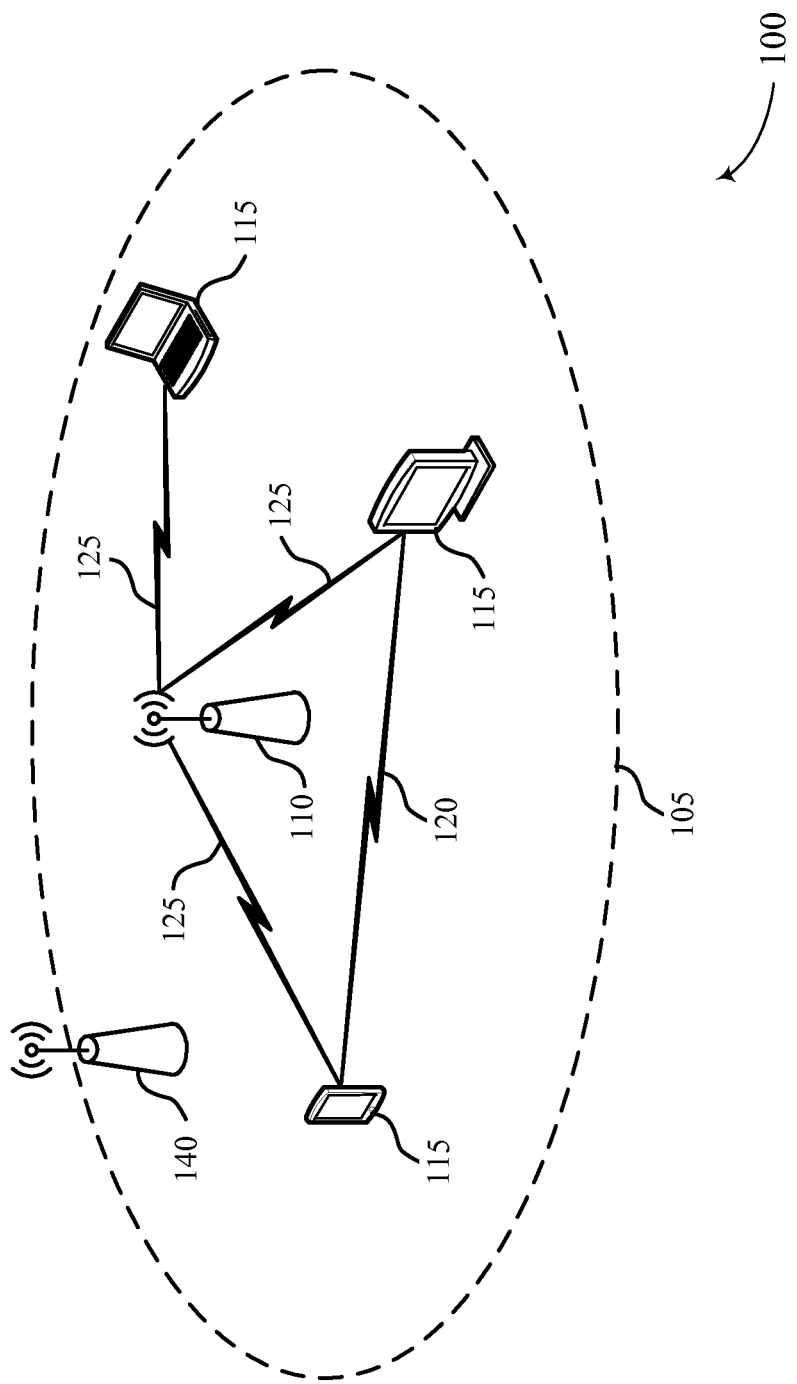
FIG. 1 illustrates an example of a wireless communications system that supports separation of control and data subbands in unlicensed spectrum in accordance with various aspects of the present disclosure.

FIG. 1 illustrates a wireless communications system 100 configured in accordance with various aspects of the present disclosure. Wireless communications system 100 may be an example of a wireless local area network (WLAN). The wireless communications system 100 may include an access point (AP) 110 and multiple associated stations (STAs) 115, which may represent devices such as mobile stations, personal digital assistant (PDAs), other handheld devices, netbooks, notebook computers, tablet computers, laptops, display devices (e.g., TVs, computer monitors, etc.), printers, etc. The various STAs 115 in the network are able to communicate with one another through the AP 110. Also shown is a coverage area 105 of the AP 110, which may represent a basic service area (BSA) of the wireless communications system 100.

Although not shown in FIG. 1, a STA 115 may be located in the intersection of more than one coverage area 105 and may associate with more than one AP 110. While only one AP 110 is illustrated, the wireless communications system 100 may include multiple APs 110. Some or all of the STAs 115 may associate and communicate with an AP 110 via a communication links 125. A communication link 125 may include uplink transmissions from a STA 115 to the AP 110, and/or downlink transmissions, from the AP 110 to the STA 115. A single AP 110 and an associated set of STAs 115 may be referred to as a basic service set (BSS). An extended service set (ESS) is a set of connected BSSs. A distribution system (DS) (not shown) may be used to connect APs 110 in an ESS. In some cases, the coverage area 105 of an AP 110 may be divided into sectors (also not shown). The wireless communications system 100 may include APs 110 of different types (e.g., metropolitan area, home network, etc.), with varying and overlapping coverage areas 105. Two STAs 115 may also communicate directly via a direct wireless link 120 regardless of whether both STAs 115 are in the same coverage area 105. Examples of direct wireless links 120 may include Wi-Fi Direct connections, Wi-Fi Tunneled Direct Link Setup (TDLS) links, and other group connections. STAs 115 and APs 110 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within wireless communications system 100.

Thus, an AP 110 may provide wireless communications via a WLAN radio access network (RAN) such as, e.g., a network implementing at least one of the IEEE 802.11 family of standards. The AP 110 may provide, for example, WLAN or other short range (e.g., Bluetooth and ZigBee) communications access to a STA 115. An AP 110 may support communications over unlicensed spectrum (e.g., contention-based spectrum) and/or licensed spectrum. The STAs 115 may be multi-access mobile devices that communicate using different radio access networks. For example, a STA 115 may be capable of communicating with a base station (not shown) using a wireless wide area network (WWAN) (e.g., Long Term Evolution (LTE)). Thus, in some examples, the wireless communications system 100 may include portions of an LTE/LTE-Advanced (LTE-A) network. The STAs 115 may be stationary or mobile and traverse the geographic coverage area 105.

Wireless communications system 100 may support communications over unlicensed radio frequency spectrum. Access to unlicensed frequencies or subbands may be contention-based; that is, each wireless device may compete with other wireless devices to use the unlicensed channel. When unlicensed spectrum is used for communications, multiple wireless devices may share a single subband for transmissions. The subband may be a half-duplex subband in which one wireless device (e.g., an AP 110 or STA 115) may transmit at a time (i.e., traffic may flow in one of two directions at a time). Collisions may occur when two or more wireless devices attempt to access a subband at the same time. When a collision occurs, a wireless device that does not currently own the subband may experience a transmission failure. To reduces or avoid collisions, a wireless device may determine if the subband is available (e.g., the wireless device may utilize carrier sense multiple access with collision avoidance (CSMA/CA)) before transmitting. In CSMA, a wireless device may check the subband for traffic prior to attempting a transmission. If the subband is free of traffic then the wireless device may attempt a transmission. On the other hand, if the wireless device determines that the subband is busy (i.e., in use by another wireless device), the wireless device may defer transmission.

In some cases, a wireless device may send a message requesting use of an idle subband to other wireless devices. For example, a STA 115 may have data pending for an AP 110. Accordingly, the STA 115 may monitor a contention-based communication subband for traffic. After the STA 115 detects that the subband is available, the STA 115 may send (e.g., broadcast) a request-to-send (RTS) packet over the subband to other wireless devices in the network. The RTS packet may convey information indicating an upcoming transmission from STA 115. Upon reception of the RTS packet, the destination wireless device (AP 110) may alert other wireless devices of an intended communication by sending a clear-to-send (CTS) packet to the STA 115. The CTS packet may indicate the duration of time the other wireless devices should refrain from using the subband. Accordingly, the STA 115 may send a packet to the AP 110 during the time indicated by the CTS packet. Thus, a subband may be reserved for use by a wireless device. In some cases, a wireless device may reserve a subband for use by other wireless devices other than itself. For example, a central coordinator 140 may transmit reservation packets over a subband that enables certain wireless devices (e.g., AP 110 and STAs 115) to use the subband while prohibiting others. The central coordinator 140 may be responsible for subband reservations and may not participate in other types of communications over the subband it reserves. In some cases, the central coordinator 140 is an AP or base station. The central coordinator 140 may have a corresponding coverage area (not shown).

Communications between wireless devices in wireless communications system 100 may include data traffic and control traffic. Control traffic (which may also be referred to as control data) may be content that provides support for communications in wireless communications system 100. Data traffic (which may also be referred to as user data, data traffic, or data) may be content that does not provide support for communications in wireless communications system 100. In some cases, data traffic and control traffic may be conveyed by different frequency resources. For example, data traffic may be sent using a set of frequencies reserved for data traffic communication. Similarly, control traffic may be sent using a set of frequencies reserved for control traffic communication. A set of frequencies may be referred to as a subband. A radio frequency spectrum band may refer to a range of the frequency spectrum that includes multiple subbands. For example, an unlicensed radio frequency spectrum band may include multiple unlicensed subbands. Thus, a wireless device may use a first unlicensed subband to communication data traffic and a second unlicensed subband to communicate control traffic.

Figure 2:
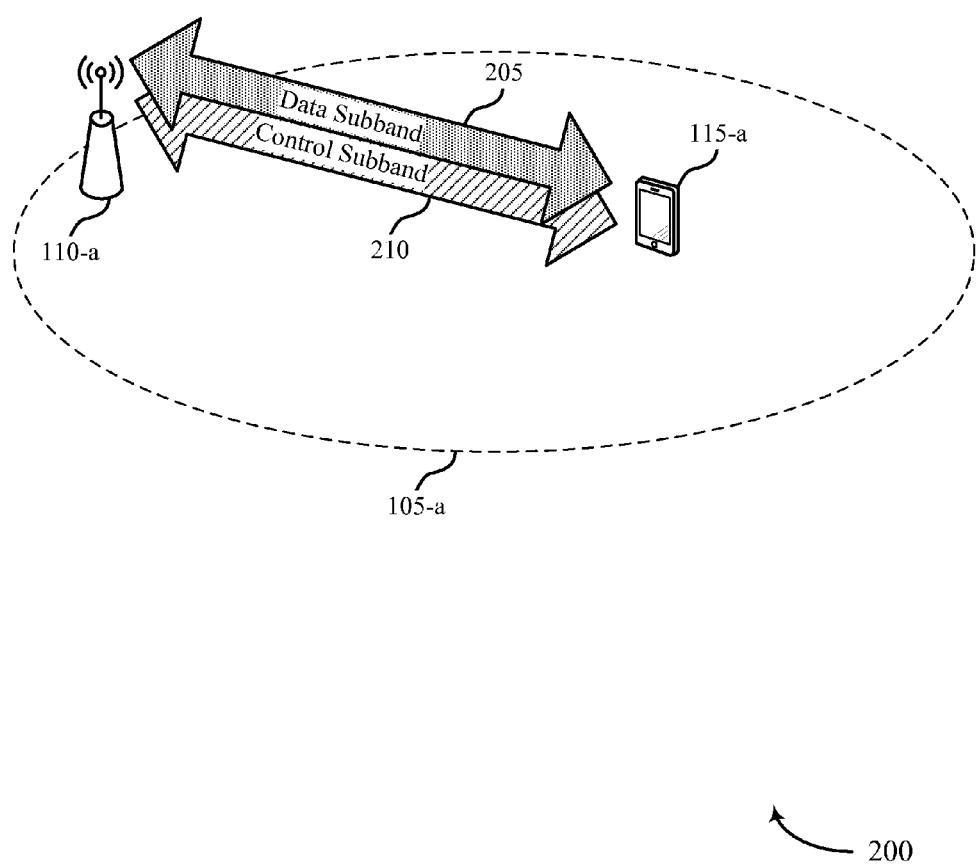
FIG. 2 illustrates an example of a wireless communications subsystem that supports separation of control and data subbands in unlicensed spectrum in accordance with various aspects of the present disclosure.

FIG. 2 illustrates an example of a wireless communications subsystem 200 that supports separation of control and data subbands in unlicensed spectrum in accordance with various aspects of the present disclosure. Wireless communications system 200 includes AP 110-*a* and STA 115-*a*, which may be examples of an AP 110 and STA 115 of the wireless communications system 100 shown in FIG. 1. Wireless devices in wireless communications subsystem 200 may communicate data traffic over a first unlicensed subband (e.g., a data subband) and control traffic over a second unlicensed subband (e.g., a control subband). The unlicensed subbands may be used by wireless devices associated with the communications subsystem 200 and by wireless devices unassociated with the wireless communications subsystem 200. A wireless device within the wireless communications subsystem 200 may reserve the unlicensed subbands for other devices in the wireless communications subsystem 200.

In the present example, STA 115-*a* may use two different unlicensed frequency spectrum subbands for communicating, one of which is dedicated to data traffic (also referred to as user data) and one of which is dedicated to control traffic (also referred to as control data). For example, STA 115-*a* may exchange data traffic with AP 110-*a* using the data subband 205 and control traffic using the control subband 210. In some cases, the two subbands may identified by STA 115-*a* prior to use. The two subbands may be contiguous or discontiguous in the frequency spectrum. In one example of discontiguous subbands, the frequency of the data subband 205 is higher than the frequency of the control subband 210 (e.g., the data subband 205 may have a frequency of 2.4 or 5 GHz and the control subband 210 may have a frequency less than 1 GHz). Because control traffic may include less content than data traffic, the control traffic may be sent using lower data rates than the data traffic. Consequently, the control traffic may retain signal integrity across greater distances than data traffic. In some cases, the bandwidth of the data subband 205 may be greater (e.g., 10 times greater) than that of the control subband 210 (e.g., the data subband 205 may have a bandwidth that is 20 GHz and the control subband 210 may have a bandwidth that is 1 MHz).

STA 115-*a* may share use of the data subband 205 and the control band with other STAs 115 and APs 110 (not shown). The other STAs 115 and APs 110 may or may not be part of the wireless communication subsystem 200. Access to the subbands may be unscheduled (e.g., access may be contention-based). Hence, STA 115-*a* may perform certain channel access procedures to gain transmission opportunities over the bands. In some cases, STA 115-*a* may implement CMSA to verify that a subband is free of traffic before attempting to transmit. If the presence of a carrier wave is detected, STA 115-*a* may back-off (e.g., refrain from transmitting) until the subband is clear. On the other hand, if STA 115-*a* determines that the subband is idle, STA 115-*a* may attempt to transmit over the subband.

In some cases, STA 115-*a* may ask permission before transmitting over an idle subband. For example, STA 115-*a* may transmit an RTS packet to AP 110-*a* (and other wireless devices in the network) that indicates STA 115-*a* has data (e.g., control traffic or data traffic) to send. The RTS may be sent over the subband that STA 115-*a* intends to use for transmission of the data. For example, if STA 115-*a* intends to send data traffic over the data subband 205, STA 115-*a* may transmit the RTS to AP 110-*a* over the data subband 205. After reception of the RTS packet, AP 110-*a* may respond to each wireless device (including STA 115-*a*) with an indication of how long STA 115-*a* may use the subband. For example, AP 110-*a* may send a CTS packet that informs each recipient (except STA 115-*a*) to defer access of the subband for the duration requested in the CTS. That is, the CTS may reserve the subband for STA 115-*a* for a period of time. Accordingly, STA 115-*a* may have exclusive access to the subband until the duration of time indicated by the CTS expires, at which point the subband becomes free for contention. Each recipient of the CTS may determine how to behave (e.g., whether to transmit or defer) by referencing the target address of the CTS. For example, if a CTS received by a wireless device is not addressed to the wireless device, the wireless device knows to abstain from transmitting during the period of reservation. If the received CTS is addressed to the wireless device, the wireless device knows that it may transmit during the period of reservation.

In some cases, a wireless device may send a self-CTS to reserve a frequency subband without asking for permission. For example, instead of requesting permission from an AP 110, the wireless device may take initiative and inform other devices on the subband to back off for a particular amount of time (e.g., by transmitting a self-CTS over the subband). The wireless device may include its own address in the self-CTS so that other wireless device do not mistakenly transmit over the subband during the period of reservation. Thus, in the present example, STA 115-*a* may send a self-CTS over the data subband 205 to reserve the data subband 205. Similarly, STA 115-*a* may send a self-CTS over the control subband 210 to reserve the control subband 210.

In accordance with aspects of the present disclosure, a self-CTS may be used to reserve a band for multiple wireless devices in a network. That is, wireless devices that detect a self-CTS may transmit during the period of reservation rather than backing off. In some cases, all of the wireless devices that are in the network that is associated with the sender of the self-CTS are allowed to use the band during the period of reservation; in other cases, only a portion of the wireless devices are allowed. A self-CTS that enables multiple wireless devices (e.g., a select group) to transmit during a corresponding subband reservation may be referred to herein as an enhanced self-CTS. An enhanced self-CTS may be device-type agnostic; that is, the enhanced self-CTS may serve predominantly the same function regardless of the type of device (e.g., AP 110 or STA 115) sends the enhanced self-CTS. For example, an enhanced self-CTS may be sent by an AP 110, STA 115, or central coordinator 140. An AP 110 or a STA 115 may have access to the subband for the duration of time that the subband is reserved by the self-CTS, irrespective of which type of device reserved the subband (e.g., the wireless device may determine that it should back-off during the period of reservation).

In some cases, a wireless device may determine the accessibility of a reserved subband by evaluating the enhanced self-CTS responsible for the reservation. For example, the enhanced self-CTS may include a network identifier (ID) that indicates the network from which the enhanced self-CTS originated. Using the network ID, the wireless device may determine if the enhanced self-CTS belongs to a network associated the wireless device. The wireless device may determine that it is permitted access to the reserved subband if the wireless device belongs to the network corresponding to the network ID. Alternatively, the wireless device may determine that it is not permitted access to the reserved subband if the wireless device does not belong to the network that corresponds to the network ID.

When wireless subsystem 200 uses separate unlicensed bands for control and data, a distributed subband reservation scheme may be used, in conjunction with enhanced self-CTS communications, to reserve the control subband 210 and/or the data subband 205. In a distributed subband reservation scheme, an AP 110 (or STA 115) may send enhanced self-CTS packets over a subband to secure it for use. The AP 110 or STA 115 that reserves a subband in a distributed subband reservation scheme may not be associated with the subsequent communications that occur over that subband in response to the enhanced self-CTS that reserved the channel. In the distributed subband reservation scheme, enhanced self-CTS packets may be sent periodically and/or synchronously, which may increase the likelihood that the control subband 210 is available for use when there are control signals ready for transmission. In some cases, the enhanced self CTS-packets may be sent opportunistically when the channel is detected as being available (e.g., traffic-free). One or more wireless devices may be responsible for sending enhanced self-CTSs over a subband. Each enhanced self-CTS may be an attempt to reserve the subband; however, only one enhanced self-CTS may succeed at a time. Irrespective of which wireless device sends a successful enhanced self-CTS over the subband, other wireless devices in the network may communicate over the subband during the period of time the subband is reserved. Thus, the control subband 210 may be reserved by an enhanced self-CTS sent over the control subband 210 and the data subband 205 may be reserved by an enhanced self-CTS sent over the data subband 205.

In an alternative to the distributed subband reservation scheme, wireless communications subsystem 200 may use a centralized subband reservation scheme. In a centralized subband reservation scheme, a central coordinator 140 (not shown) is used to reserve a subband by sending an enhanced self-CTS. In some cases, the central coordinator 140 may be an AP 110. The central coordinator may not participate in communications over the data subband 205 and the control subband 210 other than to send enhanced self-CTSs. Accordingly, the central coordinator may be unassociated with traffic sent over the subband in response to the reservation (e.g., the central coordinator may be unassociated with control traffic that is sent over the control subband 210 during the channel reservation period that corresponds to an enhanced self-CTS sent by the central coordinator 140).

Thus, the centralized subband reservation scheme may differ from the distributed subband reservation scheme in that after the central coordinator 140 has reserved a subband, the central coordinator 140 may refrain from transmitting or receiving signals over that subband; that is, the central coordinator 140 may reserve the subband for use by wireless devices other than itself. Similarly, the central coordinator 140 may be unassociated with data traffic that is sent over the data subband 205 during the channel reservation period that corresponds to an enhanced self-CTS sent by the central coordinator 140. Thus, the central coordinator 140 may send enhanced self-CTSs over the control subband 210 and the data subband 205 to reserve them for communications by other wireless devices.

Figure 3:
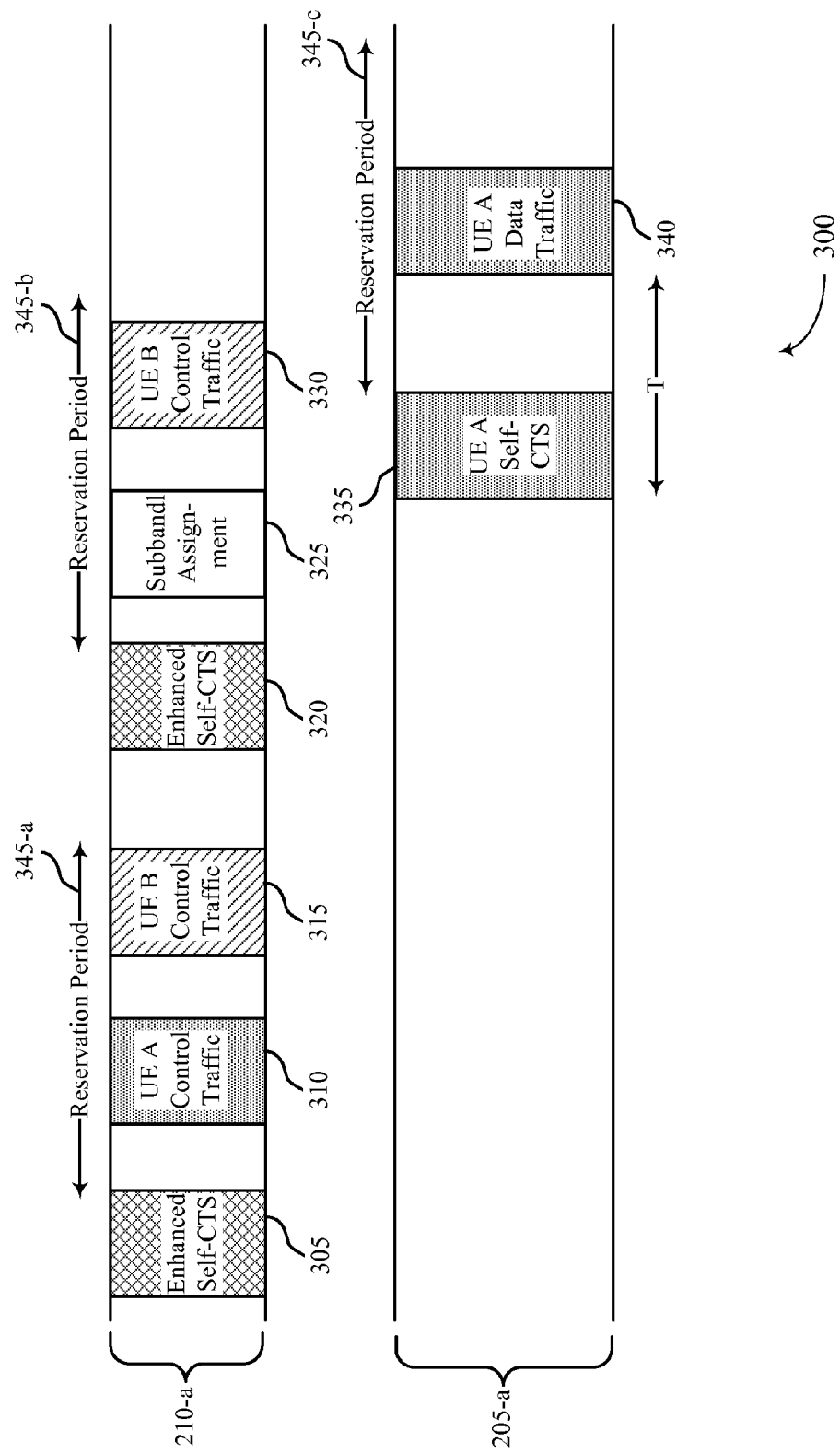
FIG. 3 illustrates an example of enhanced self-CTS communications that support separation of control and data subbands in unlicensed spectrum in accordance with various aspects of the present disclosure.

FIG. 3 illustrates an example of enhanced self-CTS communications 300 that support separation of control and data subbands in unlicensed spectrum in accordance with various aspects of the present disclosure. Enhanced self-CTS communications 300 may be examples of messages transmitted by APs 110 and STAs 115 (or a central coordinator 140) as described with reference to FIGS. 1 and 2. Control traffic may be communicated over control subband 210-a and data traffic may be communicated over data subband 205-a.

A wireless device may transmit an enhanced self-CTS 305 over control subband 210-a. The wireless device may be an AP 110, a STA 115, or a central coordinator 140. The enhanced self-CTS 305 may indicate to other wireless devices (e.g., those in the same network as the sending wireless device) that control subband 210-a is reserved for their use for an allocated duration of time (e.g., reservation period 345-a). The enhanced self-CTS 305 may indicate to other wireless devices (e.g., those in a different network as the sending wireless device) that control subband 210-a is off-limits, or restricted, for the reservation period 345-a. Subsequent to the successful enhanced self-CTS 305, and during the reservation period 345-a, multiple wireless devices in the network are allowed to use control subband 210-a. For example, a STA 115 A may use control subband 210-a to send control traffic 310 and a STA 115 B may use control subband 210-a to send control traffic 315 (e.g., to an AP 110).

Prior to sending control traffic 310, the STA 115 A may determine or verify the accessibility of control subband 210-a (e.g., STA 115 A may determine that it is allowed to transmit to during the reservation period 345-a). In one example, the enhanced self-CTS may include an indication of the network (e.g., the network ID) associated with the sender of the enhanced self-CTS. The STA 115 A may evaluate the network ID conveyed by the enhanced self-CTS and determine if the network ID matches a network associated with the STA 115 A. If the network ID matches a network associated with the STA 115 A, the STA 115 A may determine that control subband 210-a is available for use by the STA 115 A during the reservation period 345-a. If the network ID does not match a network associated with the STA 115 A, the STA 115 A may determine that control subband 210-a is unavailable for use by the STA 115 A during the reservation period 345-a (e.g., the STA 115 A may back-off and refrain from transmitting). The STA 115 B (and other devices that receive the enhanced self-CTS 305) may use a similar evaluation process to determine the availability of control subband 210-a during the reservation period 345-a.

During the channel reservation period 345-a, wireless devices in the network (e.g., STA 115 A and STA 115 B) may access control subband 210-a according to a channel access protocol or procedure. In one example, the wireless devices may attempt channel access using a random access scheme such as CSMA. In other examples, the wireless devices may attempt channel access using a predetermined round robin time scheme such as time division multiple access (TDMA). In TDMA, shared frequency resources (e.g., a subband) may be allocated to multiple wireless devices on a time basis; that is, each wireless device may have access to the frequency resources during different time slots. The round robin scheme may be determined by an AP 110 or central coordinator 140. In some cases, an access schemes may be implemented if the number of wireless device on the network exceeds a congestion threshold. In some cases, it may be determined that the number of wireless devices on the network does not exceed the congestion threshold. In such a scenario, the channel access scheme may be unstructured. Thus, channel access may be based on the number of wireless devices currently being served by the network.

After the channel reservation period 345-*a* of control subband 210-*a* has elapsed, control subband 210-*a* may be available for use by wireless devices inside and outside of the network; that is, control subband 210-*a* may be available for contention. Hence, another enhanced self-CTS 320 may be transmitted over control subband 210-*a*. The enhanced self-CTS 320 may be sent opportunistically or periodically. The enhanced self-CTS 320 may be transmitted by the same wireless device as enhanced self-CTS 305, or by a different wireless device. During the subsequent corresponding reservation period 345-*b*, an AP 110 in the network may transmit a subband assignment 325 over control subband 210-*a*. The subband assignment may be sent to STA 115 A in the network and may indicate a scheduled transmission time for STA 115 A to send data traffic over data subband 205-*a*. In some cases, the subband assignment may be sent in response to a traffic request sent from the STA 115 A (e.g., in control traffic 310).

In some cases, other wireless devices may also transmit during reservation period 345-*b*. For example, the STA 115 B may transmit control traffic 330 over control subband 210-*a* before the reservation period 345-*b* expires. Control traffic may include a channel quality indication (CQI) message that indicates the quality of a subband. In the present example, control traffic 330 may include a CQI message for data subband 205-*a*. Additionally or alternatively, control traffic may include a traffic request that indicates that the sender has data ready to send. In the present example, control traffic 330 may include a traffic request that alerts an AP 110 of data pending at the STA 115 B. A subband assignment such as subband assignment 325 may be in response to a traffic request.

Upon reception of the subband assignment 325, the STA 115 A may determine a time T before the scheduled transmission time. The scheduled transmission time may indicate to the STA 115 A when the corresponding AP 110 will be expecting data traffic from the STA 115 A. Accordingly, the STA 115 A may transmit an enhanced self-CTS 335 over data subband 205-*a* at a time T before the scheduled transmission time in an attempt to secure data subband 205-*a* during the scheduled transmission time. Providing that the enhanced self CTS 335 is successful, the STA 115 A may transmit data traffic 340 (e.g., user data) over data subband 205-*a* during the reservation period 345-*c* corresponding to the enhanced self-CTS 335. Although transmissions on data subband 205-*a* are not shown before the enhanced self-CTS 335, such communications may occur.

Figure 4:
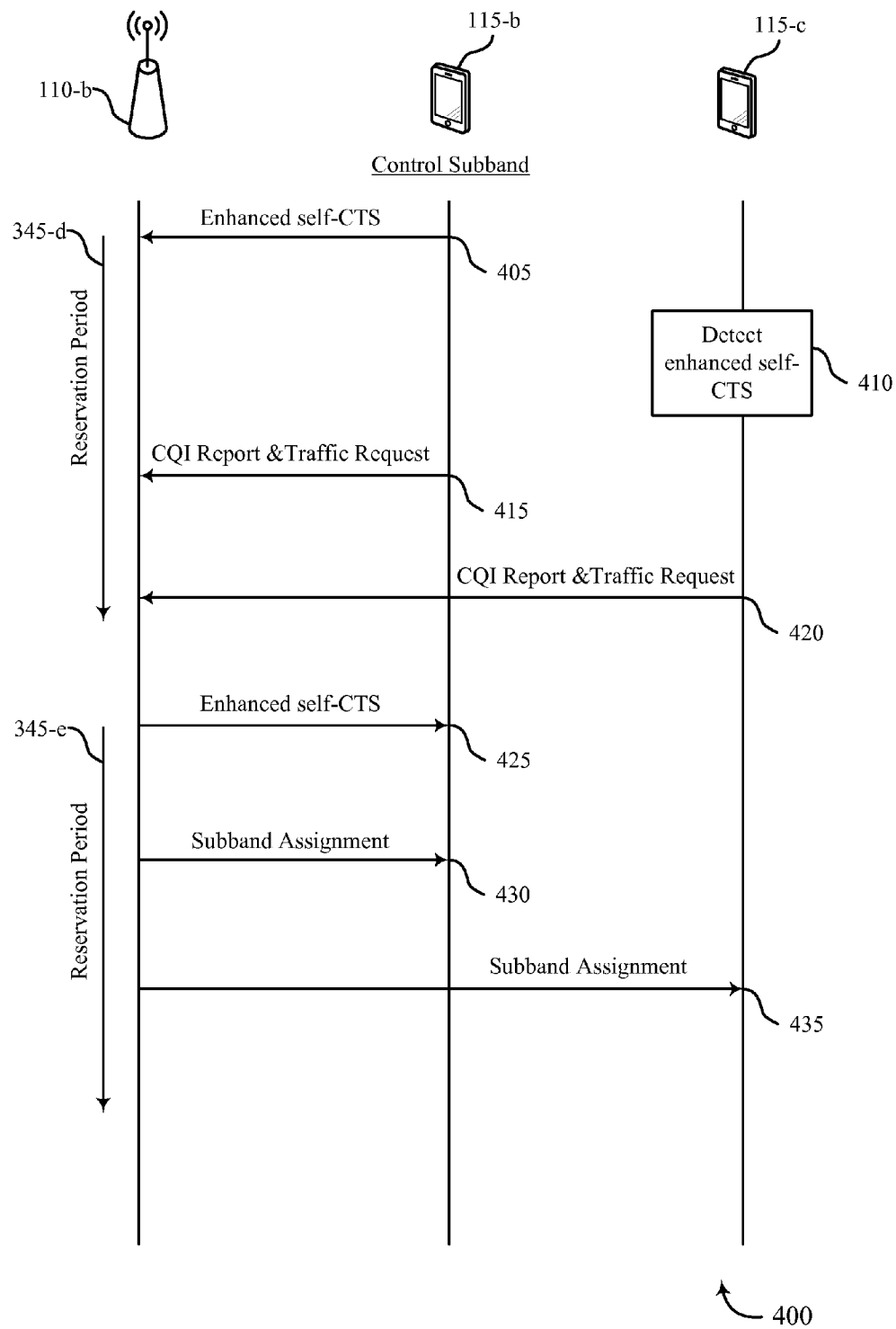
FIG. 4 illustrates an example of a process flow that supports separation of control and data subbands in unlicensed spectrum in accordance with various aspects of the present disclosure.

FIG. 4 illustrates an example of a process flow 400 that supports separation of control and data subbands in unlicensed spectrum in accordance with various aspects of the present disclosure. Process flow may include AP 110-*b*, STA 115-*b*, and STA 115-*c*, each of which may perform the functions of an AP 110 and STA 115, respectively, as described with reference to FIGS. 1-3. STA 115-*b* and STA 115-*c* may be in the same network as AP 110-*b* and may be connected to AP 110-*b* such that both STA 115-*b* and STA 115-*b* are able to detect enhanced self-CTSs that are sent over the control subband. The control subband may be an example of a control subband 210 described with reference to FIGS. 2 and 3. Process flow 400 may be an example of communications associated with a distributed subband reservation scheme. For example, control traffic that is communicated on the control subband during channel reservation may be associated with the wireless device that reserved the control subband. Alternatively or additionally, the device that reserves the control subband may reserve the control subband for use by a number of devices that includes the reserving device. The control subband may be reserved by an enhanced self-CTS and may be available for use by multiple STAs 115 and/or APs 110 in the network during the reservation.

At 405, STA 115-*b* may send an enhanced self-CTS to AP 110-*b* over the control subband. The enhanced self-CTS may be in response to detection that STA 115-*b* has control traffic ready to send. In this example, the enhanced self-CTS is successful and the control subband is reserved for a duration of time (e.g., reservation period 345-*d*). At 410, STA 115-*c* may detect the enhanced self-CTS sent over the control subband. In some cases, the STA 115-*c* may detect a network ID carried by the enhanced self-CTS and compare it to a set of network IDs associated with STA 115-*c*. If the network ID conveyed by the enhanced self-CTS matches a network ID associated with STA 115-*c*, STA 115-*c* may determine that it is allowed to use the control subband during the channel reservation period 345-*d*. Alternatively, if the network ID conveyed by the enhanced self-CTS does not match the network ID(s) associated with STA 115-*c*, STA 115-*c* may determine that it should back-off during the reservation period 345-*d*. In this example, the enhanced self-CTS originates from a STA 115 that is in the same network as STA 115-*c*, so STA 115-*c* determines that the channel reservation period 345-*d* is unrestricted for STA 115-*c* during the reservation period 345-*d*.

At 415, STA 115-*b* may take advantage of the channel reservation period 345-*d* and transmit a CQI report and traffic request, such as described in FIG. 3. In some cases, other control information may be transmitted instead of (or along with) the CQI report and traffic request. In some examples, either the CQI or the traffic request is sent. The CQI report may include information about the control subband or the corresponding data subband (not shown). The traffic request may indicate to AP 110-*b* that STA 115-*b* has data ready to send over the data subband. Proceeding to 420, STA 115-*c* may, based on its detection of enhanced self-CTS and corresponding network ID, send a CQI report and traffic request. STA 115-*c* may send the CQI report and traffic request over the control subband during the period of time the control channel is reserved by the enhanced self-CTS (e.g., during the reservation period 345-*d*).

After expiry of the channel reservation period 345-*d* and at 425, AP 110-*b* may transmit an enhanced self-CTS over the control subband to STA 115-*b*. In this example, the enhanced self-CTS reserves the control subband for use by multiple wireless devices in the network (e.g., AP 110-*b*, STA 115-*b*, and UE-c) for a duration of time (e.g., reservation period 345-*e*). Accordingly, during the reservation period 345-*e* and at 430, AP 110-*b* may transmit a subband assignment message to STA 115-*c*. The subband assignment message may indicate to STA 115-*b* when AP 110-*b* expects to receive data traffic from STA 115-*b* over the data subband. At 435, AP 110-*b* may send a subband assignment to STA 115-*c* indicating when STA 115-*c* should send its data traffic over the data subband. The reservation periods 345 may be the same or different lengths of time, as indicated in the corresponding enhanced self-CTS.

Figure 5:
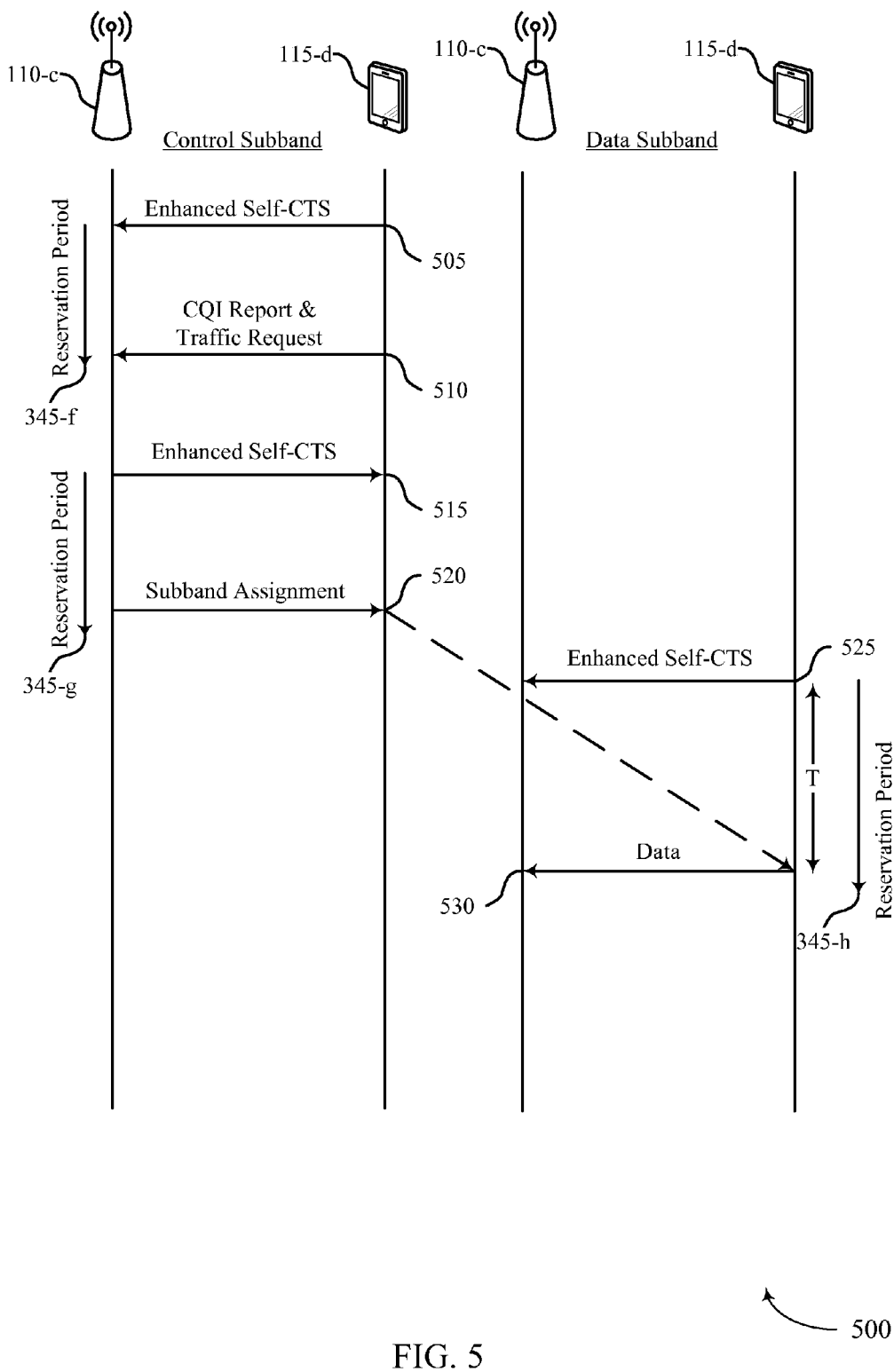
FIG. 5 illustrates an example of a process flow that supports separation of control and data subbands in unlicensed spectrum in accordance with various aspects of the present disclosure.

FIG. 5 illustrates an example of a process flow 500 that supports separation of control and data subbands in unlicensed spectrum in accordance with various aspects of the present disclosure. Process flow 500 may be an example of communications associated with a distributed subband reservation scheme. Process flow 500 may include AP 110-*c* and STA 115-*d*, which may examples of an AP 110 and STA 115, respectively, as described with reference to FIGS. 1-4. STA 115-*d* and AP 110-*c* may communicate control traffic over the control subband and data traffic (e.g., user data) over the data subband, such as described with reference to FIGS. 1-4. Wireless devices (e.g., 105-*c* and STA 115-*d*) may reserve the control and data subbands for other devices that share the same network by sending enhanced self-CTSs.

At 505, STA 115-*d* may send an enhanced self-CTS to AP 110-*c*. The enhanced self-CTS may reserve the control subband for a duration of time (e.g., reservation period 345-*f*) indicated in the enhanced self-CTS. The reservation may enable wireless devices in the same network as STA 115-*d* to transmit during the reservation period 345-*f* while restricting wireless devices belonging to other networks from accessing the control subband. At 510, STA 115-*d* may use the control subband to transmit a CQI report and a traffic request to AP 110-*c*. After the channel reservation period 345-*f* has expired, AP 110-*c* may, at 515, send an enhanced self-CTS over the control subband to STA 115-*d*. The enhanced self-CTS may reserve the control subband for a duration of time (e.g., reservation period 345-*g*) indicated by the enhanced self-CTS. During the reservation period 345-*g* and at 520, AP 110-*c* may transmit a subband assignment to STA 115-*d*. The subband assignment may indicate to STA 115-*d* when AP 110-*c* will be expecting traffic from STA 115-*d* over the data subband (e.g., the subband assignment may indicate a scheduled transmission time). Prior to sending the data traffic, STA 115-*d* may, at 525, send an enhanced self-CTS over the data subband to AP 110-*c*. The enhanced self-CTS may reserve the data subband for reservation period 345-*h*. The enhanced self-CTS may be in response to the subband assignment. For example, STA 115-*d* determine a time T (e.g., T milliseconds (ms)) before AP 110-*c* expects the data and send an enhanced self-CTS. The enhanced self-CTS may secure the data subband for transmission of data traffic at 530.

Although not shown, other wireless devices associated with the control subband and/or data subband may be capable of detecting enhanced self-CTSs sent over the respective subbands. Additionally, one or more of the wireless devices in the same network as AP 110-*c* and/or STA 115-*d* may transmit over a subband reserved by the enhanced self-CTS during a reservation. In some cases, the wireless devices may determine whether a reserved subband is restricted or accessible by comparing their network ID with the network ID carried by the enhanced self-CTSs.

Figure 6:
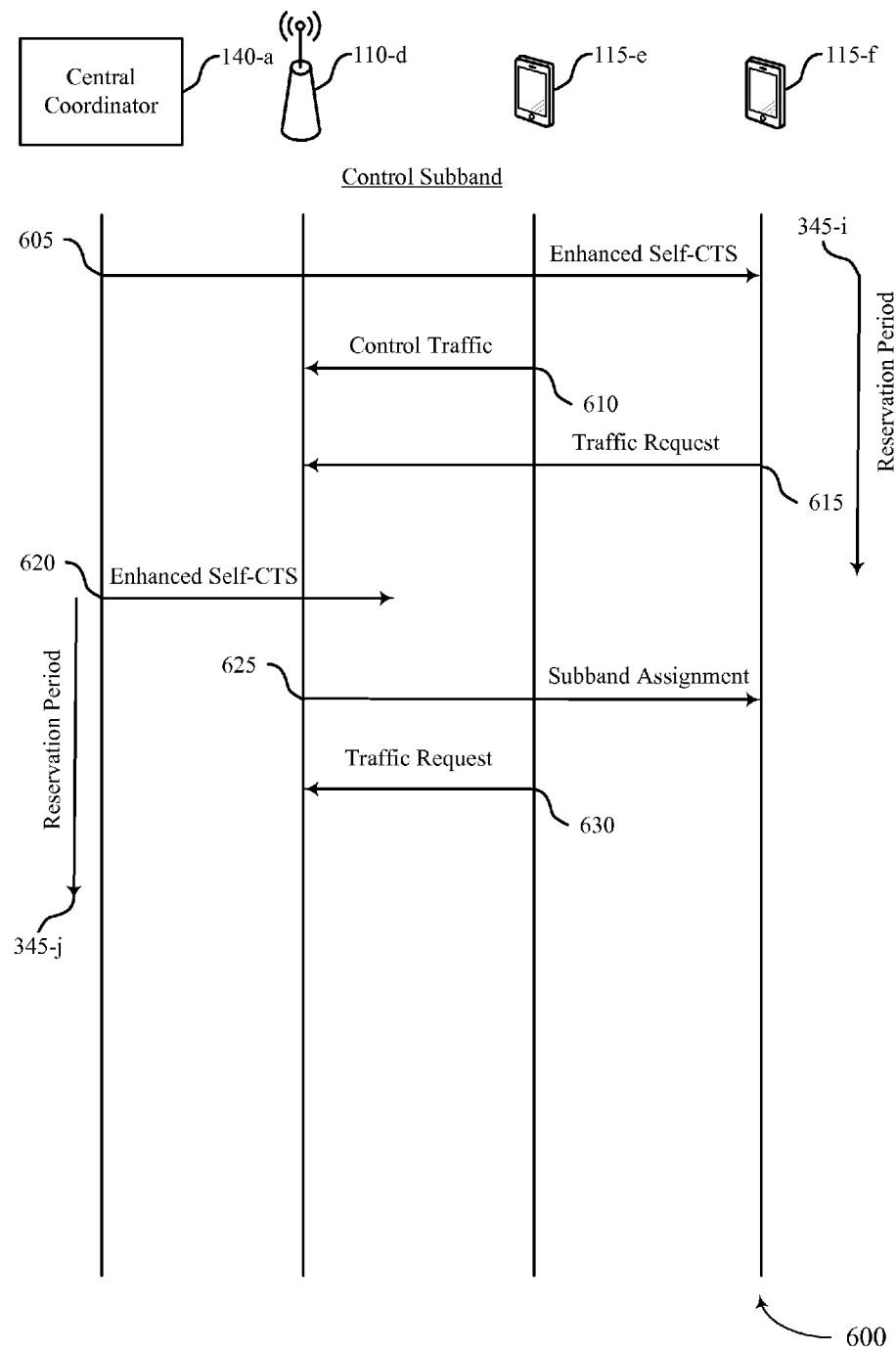
FIG. 6 illustrates an example of a process flow that supports separation of control and data subbands in unlicensed spectrum in accordance with various aspects of the present disclosure.

FIG. 6 illustrates an example of a process flow 600 that supports separation of control and data subbands in unlicensed spectrum in accordance with various aspects of the present disclosure. Process flow 600 may include a central coordinator 140-*a*, AP 110-*d*, STA 115-*e*, and STA 115-*f*. Central coordinator 140-*a* may be an example of a central coordinator 140 described with reference to FIG. 1. Process flow 600 may be an example of communications associated with a centralized subband reservation scheme. The central coordinator 140-*a* may reserve the control subband for other devices in the same network by sending enhanced self-CTSs. That is, devices other than central coordinator 140-*a* may access the control subband during the periods of time reserved by the central coordinator 140-*a*. Thus, the central coordinator 140-*a* may be responsible for reservation of the control band.

At 605, the central coordinator 140-*a* may transmit an enhanced self-CTS over the control subband to STA 115-*f*. The enhanced self-CTS may reserve the control subband for use by wireless devices in the network other than the central coordinator 140-*a*. The reservation may be for a duration of time specified by the enhanced self-CTS (e.g., the control subband may be reserved for reservation period 345-*i*). In some cases, the enhanced self-CTS may include a network ID that is associated with the central coordinator 140-*a*. Wireless devices inside and outside the network may determine the accessibility of the control subband during reservation period 345-*i* based on the network ID. For example, wireless devices in the network (e.g., AP 110-*d*, STA 115-*e*, and STA 115-*f*) may determine that the control subband is available for use during the reservation period 345-*i* by detecting that the network ID corresponds to a network with which the wireless devices are affiliated. Accordingly, the wireless devices may transmit messages during the reservation period 345-*i*. For instance, at 610, STA 115-*e* may send control traffic to AP 110-*d*. And at 615, STA 115-*f* may send a traffic request to AP 110-*d*. The traffic request may correspond to data pending at STA 115-*f* for transmission over a corresponding data subband (not shown).

After the expiration of the reservation period 345-*i*, the central coordinator 140-*a* may detect that the control subband is free of traffic and send an enhanced self-CTS at 620. In some cases, the central coordinator 140-*a* may send enhanced self-CTSs periodically. The enhanced self-CTS may reserve the control subband for use by network devices for a second duration of time (e.g., reservation period 345-*j*). At 625, upon detection that the control subband is available during the reservation period 345-*j*, AP 110-*d* may send subband assignment to STA 115-*f*. The subband assignment may be in response to the traffic request sent at 615. The subband assignment may indicate a scheduled time for STA 115-*f* to transmit over the data subband (not shown). Multiple devices may be allowed to transmit during reservation period 345-*j*, providing they are in the same network as central coordinator 140-*a*. Accordingly, at 630, STA 115-*e* may transmit a traffic request to AP 110-*d*. Additionally, STA 115-*f* may send a CQI report (e.g., for the data subband (not shown)). Although not shown, an enhanced self-CTS may be sent over the data subband an amount of time T before the transmission time scheduled by the subband assignment. The enhanced self-CTS may be transmitted by AP 110-*d* or STA 115-*f* and may reserve the data subband such that the reservation overlaps the scheduled transmission time. Thus, STA 115-*f* may transmit uplink data over the data band at the scheduled transmission time.

Figure 7:
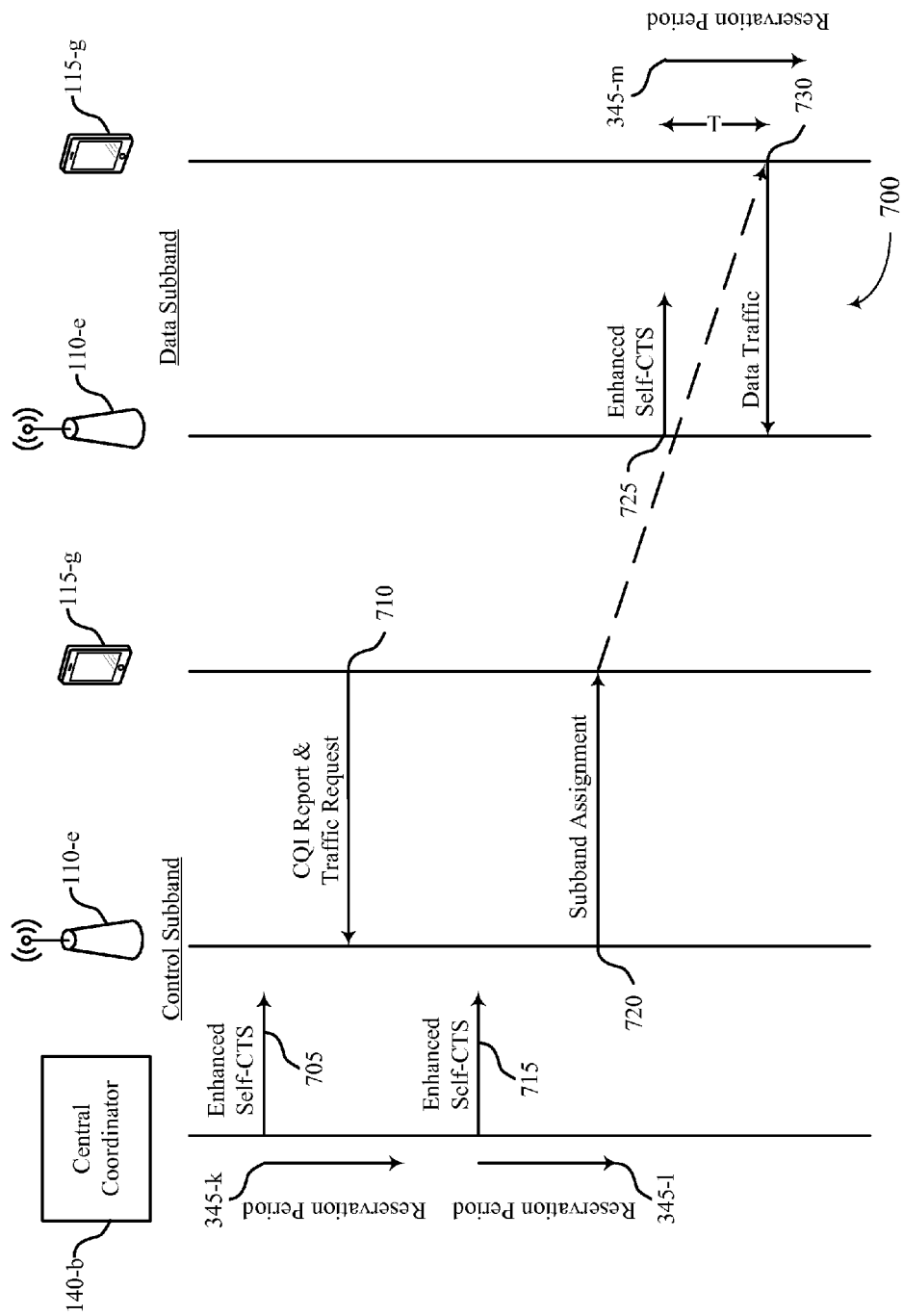
FIG. 7 illustrates an example of a process flow that supports separation of control and data subbands in unlicensed spectrum in accordance with various aspects of the present disclosure.

FIG. 7 illustrates an example of a process flow 700 that supports separation of control and data subbands in unlicensed spectrum in accordance with various aspects of the present disclosure. Process flow 700 may be an example of communications associated with a centralized subband reservation scheme. For example, process flow 700 may provide control band reservations by a central coordinator (e.g., central coordinator 140-*b*). Central coordinator 140-*b* may be an example of a central coordinator 140-*a* described with reference to FIG. 6. AP 110-*e* and STA 115-*g* may also be included in process flow 700, and may be examples of an AP 110 and STA 115 described with respect to FIGS. 1-6. AP 110-*e* and STA 115-*g* may be connected to central coordinator 140-*b* such central coordinator 140-*b* may allocate time slots for transmissions of control signals between AP 110-*e* and STA 115-*g*. Other wireless devices in the network (not shown) may be similarly connected to central coordinator 140-*b*. In some examples, the control subband is lower in frequency than the data subband and has a smaller bandwidth than the data subband. For example, the bandwidth of the data subband may be at least ten times larger than the control subband. In some examples, the control subband is in a sub 1 GHz range and the data subband is in a 2.4 GHz or 5 GHz band.

At 705, central coordinator 140-*b* may send an enhanced self-CTS over the control subband. The enhanced self-CTS may be received by multiple wireless devices associated with the control subband, including AP 110-*e* and STA 115-*g*. The enhanced self-CTS may reserve the control subband for a duration of time (e.g., reservation period 345-*k*). The enhanced self-CTS may be transmitted according to a periodic transmission schedule or upon detection that the control subband is free of traffic. At 710, STA 115-*g* may opportunistically use the control channel during the reservation period 345-*k* to send a CQI report and a traffic request. However, other control information may be transmitted during this time, including control information from other wireless devices. The transmission may be based on a determination that the enhanced self-CTS is associated with a network to which STA 115-*g* belongs.

After the control channel reservation period 345-*k* has expired, the central coordinator 140-*b* may send another enhanced self-CTS at 715 to reserve the control channel again, this time for reservation period 345-*l*. During the channel reservation period 345-*l* and at 720, AP 110-*e* may send a subband assignment to STA 115-*g*. The subband assignment may indicate to STA 115-*g* when AP 110-*e* expects to receive data traffic over the data subband (e.g., the subband assignment may include a transmission time). Accordingly, at 725, and at T ms before the scheduled transmission time, AP 110-*e* may secure the data subband by sending an enhanced self-CTS over the data subband. The enhanced self-CTS may reserve the data subband for a duration of time (e.g., reservation period 345-*m*). Although described in terms of milliseconds, the time T may be any amount of time before the scheduled transmission time, providing that T is not greater than the reservation period 345-*m*. Thus, the data subband may be reserved and available for use by STA 115-*g* during the schedule transmission time. Accordingly, STA 115-*g* may, at 730, transmit uplink data traffic to AP 110-*e* over the data subband.

Figure 8:
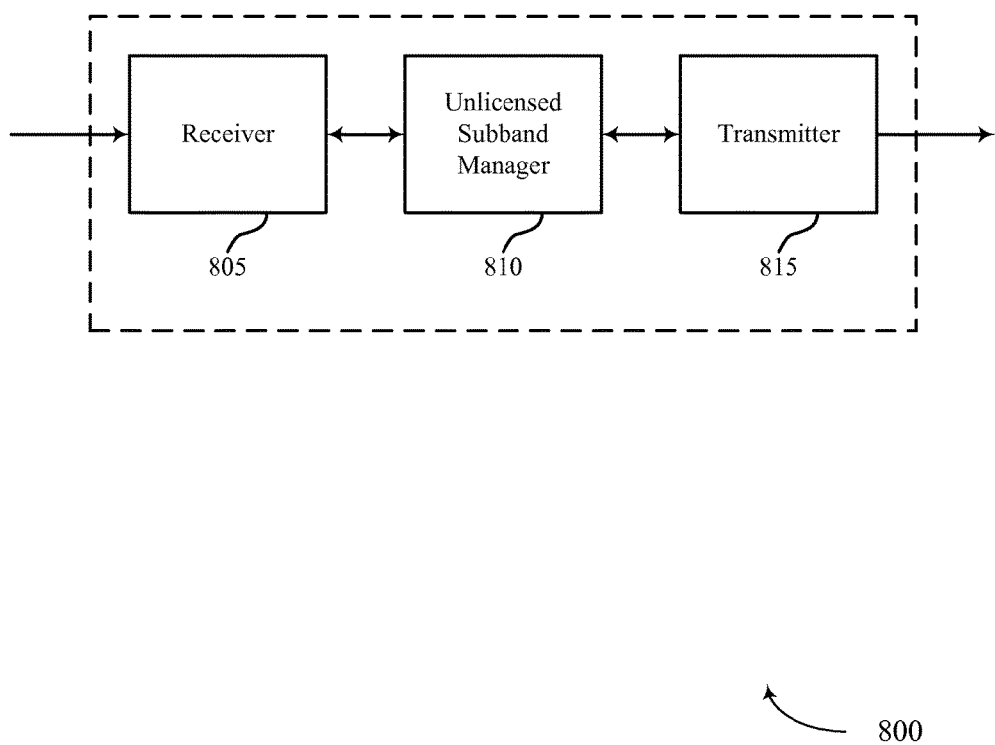
FIGS. 8-10 show block diagrams of a wireless device that supports separation of control and data subbands in unlicensed spectrum in accordance with various aspects of the present disclosure.

FIG. 8 shows a block diagram of a wireless device 800 configured for separation of control and data subbands in unlicensed spectrum in accordance with various aspects of the present disclosure. Wireless device 800 may be an example of aspects of a STA 115 described with reference to FIGS. 1-7. Wireless device 800 may include a receiver 805, an unlicensed subband manager 810, or a transmitter 815. Wireless device 800 may also include a processor. Each of these components may be in communication with each other. Wireless device 800 may participate in communications associated with a distributed subband reservation scheme or a centralized subband reservation scheme.

The receiver 805 may receive information such as packets, user data, or control information associated with various information channels. For example, the receiver 805 may receive control signals over a control subband in an unlicensed radio frequency spectrum band. The receiver 805 may also receive data signals over a data subband in an unlicensed radio frequency spectrum band. In some cases, the receiver 805 supports the separation of control and data subbands in unlicensed spectrum by collaborating with other components of wireless device 800. For example, the receiver 805 may pass information to the unlicensed subband manager 810, and to other components of wireless device 800.

The unlicensed subband manager 810 may identify a first subband (e.g., a control subband) in an unlicensed radio frequency spectrum band used to communicate control traffic. The unlicensed subband manager 810 may also identify a second subband (e.g., a data subband) in the unlicensed radio frequency spectrum band used to communicate data traffic. The first subband and the second subband may be different. In some cases, the first subband is lower in frequency than the second subband and has a smaller bandwidth than the second subband. In some cases, the first subband is in a sub 1 GHz range and the second subband is in a 2.4 GHz or 5 GHz band. The bandwidth of the second subband may be at least 10 times larger than the bandwidth of the first subband. The unlicensed subband manager 810 may reserve the first subband for a first duration of time for a plurality of wireless devices. The reservation may be based at least in part on an enhanced self-CTS transmitted over the first subband.

The transmitter 815 may transmit signals received from other components of wireless device 800. The transmitter 815 may transmit control signals (e.g., traffic requests, CQI reports, etc.) over the first subband and data signals over the second subband. The transmitter may collaborate with other components of wireless device 800 (e.g., unlicensed subband manager 810) to support separation of control and data subbands in unlicensed spectrum. For example, the transmitter 815 may collaborate with the unlicensed subband manager 810 to send enhanced self-CTSs over the first and/or second subbands. In some examples, the transmitter 815 may be collocated with the receiver 805 in a transceiver module. The transmitter 815 may include a single antenna, or it may include a plurality of antennas.

Figure 9:
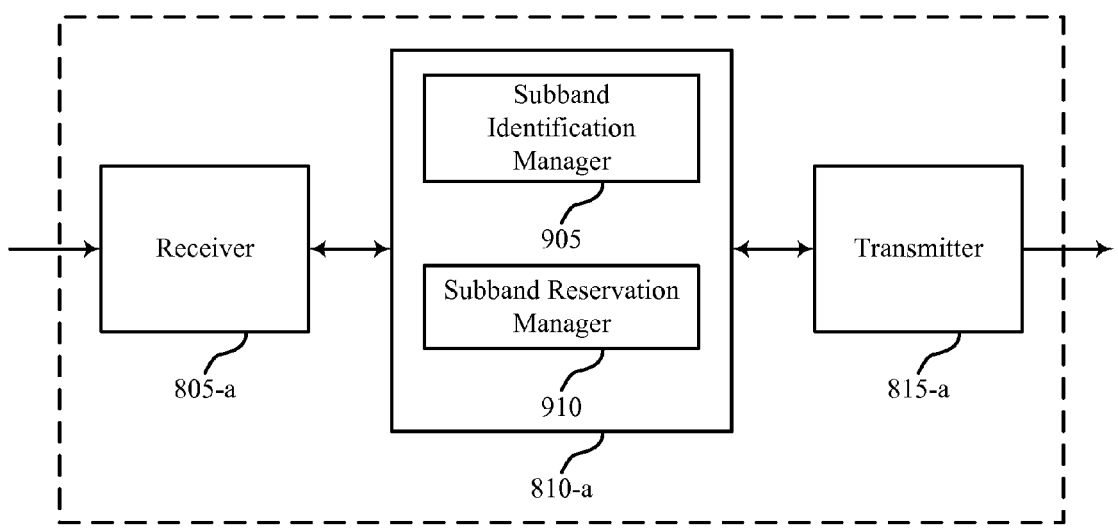

FIG. 9 shows a block diagram of a wireless device 900 for separation of control and data subbands in unlicensed spectrum in accordance with various aspects of the present disclosure. Wireless device 900 may be an example of aspects of a wireless device 800 or a STA 115 described with reference to FIGS. 1-8. Wireless device 900 may include a receiver 805-*a*, an unlicensed subband manager 810-*a*, or a transmitter 815-*a*. Wireless device 900 may also include a processor. Each of these components may be in communication with each other. The unlicensed subband manager 810-*a* may include a subband identification manager 905, and a subband reservation manager 910.

The receiver 805-*a* may receive information (e.g., over control and data subbands) which may be passed on to unlicensed subband manager 810-*a*, and to other components of wireless device 900. The unlicensed subband manager 810-*a* may perform the operations described with reference to FIG. 8. The transmitter 815-*a* may transmit signals received from other components of wireless device 900 over the separate control and data subbands.

The subband identification manager 905 may identify a first subband (e.g., a control subband) in an unlicensed radio frequency spectrum band used to communicate control traffic. The subband identification manager 925 may also identify a second subband (e.g., a data subband) in the unlicensed radio frequency spectrum band used to communicate data traffic. The first subband and the second subband may be separate in frequency; that is, the first subband and the second subband may use different frequencies as described with reference to FIGS. 2-7. The first subband may use a lower frequency than that used by the second subband. The first subband may have a smaller bandwidth than that of the second subband.

The subband reservation manager 910 may reserve subbands for use by wireless devices in the same network. In some cases, the subband reservation manager 910 may reserve a subband by collaborating with transmitter 815-a to transmit an enhanced self-CTS over a subband. The enhanced self-CTS may include a network ID that corresponds to the network associated with the wireless device 900. In one example, the subband reservation manager 910 reserves the first subband for a first duration of time for use by a number of wireless devices in the same network as wireless device 900. The reservation may be based at least in part on an enhanced self-CTS transmitted over the first subband as described with reference to FIGS. 2-7.

The components of wireless device 800, wireless device 900, and unlicensed subband manager 810 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
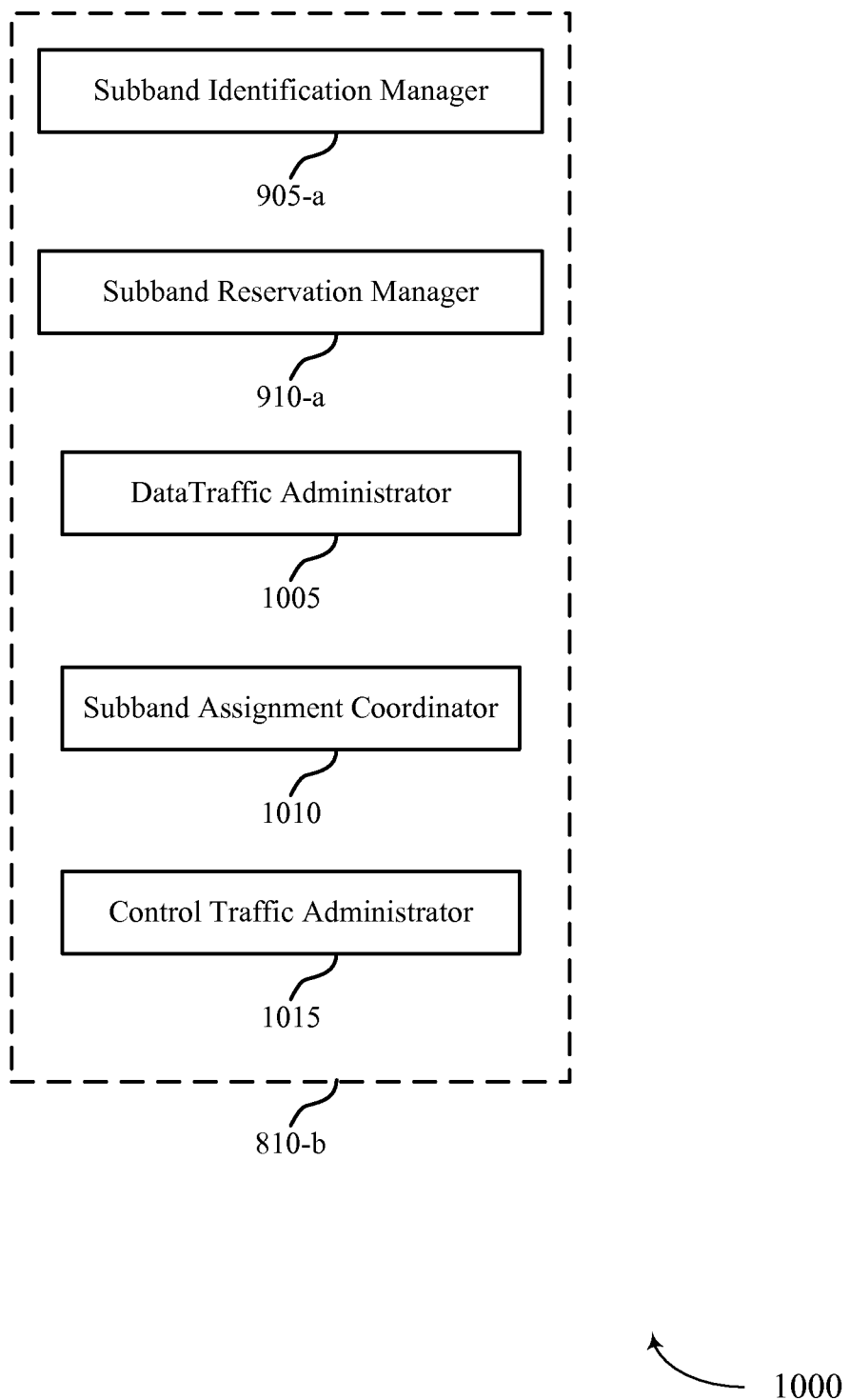

FIG. 10 shows a block diagram 1000 of an unlicensed subband manager 810-b for separation of control and data subbands in unlicensed spectrum in accordance with various aspects of the present disclosure. Unlicensed subband manager 810-b may be a component of a wireless device 800 or a wireless device 900. For instance, the unlicensed subband manager 810-b may be an example of aspects of an unlicensed subband manager 810 described with reference to FIGS. 8-9. The unlicensed subband manager 810-b may include a subband identification manager 905-a and a subband reservation manager 910-a. Each of these modules may perform the functions described with reference to FIG. 9. The unlicensed subband manager 810-b may also include an data traffic administrator 1005, a subband assignment coordinator 1010, and a control traffic administrator 1015.

The data traffic administrator 1005 may collaborate with a receiver 805 to receive data traffic over a data subband (e.g., the second subband described with reference to FIGS. 8 and 9). The data traffic may be received during a duration of time in which the data subband is reserved for use by multiple wireless devices in the same network. The data band may be reserved for the duration of time by an enhanced self-CTS transmitted over the data subband by wireless device or another wireless device (e.g., an AP 110) as described with reference to FIGS. 2-7. In some cases, the data traffic administrator 1005 may collaborate with a transmitter 815 to transmit data traffic over the data subband during a duration of time in which the data subband is reserved for use by multiple of wireless devices in the same network. The data subband may be reserved for use via an enhanced self-CTS that is transmitted over the data subband, either by the wireless device or another wireless device (e.g., an AP 110).

The subband assignment coordinator 1010 may collaborate with a receiver 805 to receive a subband assignment for the data subband (e.g., the second subband as described with reference to FIGS. 8 and 9). The subband assignment may be received over a control subband (e.g., the first subband as described with reference to FIGS. 8 and 9) during a duration of time in which the control subband is reserved (e.g., for use by wireless devices in the same network). The control subband may be reserved via an enhanced self-CTS transmitted over the control subband (e.g., by wireless device, and AP 110, or a central coordinator 140). In some cases, the subband assignment coordinator 1010 may collaborate with a transmitter 815 to transmit data traffic over the data subband. The transmission may be scheduled based on a subband assignment. The data subband may be reserved for the transmission via an enhanced-self CTS sent over the data subband by the wireless device or an AP 110. In some cases, the enhanced-self CTS is sent based on a subband assignment (e.g., the enhanced self-CTS may be sent T ms before the scheduled transmission time).

The control traffic administrator 1015 may collaborate with a receiver 805 to receive control traffic sent over the control subband by a wireless device in the same network as wireless device. The control traffic may be received during a duration of time in which the control subband is reserved for use, as described with reference to FIGS. 2-7. In some cases the control traffic administrator 1015 may collaborate with a transmitter 815 to transmit control traffic over the control subband during the reserved duration of time. In some examples, transmitting the control traffic includes transmitting the control traffic according to a random access scheme or a pre-determined round robin TDMA scheme. In some cases, the control traffic includes a traffic request and/or a CQI report.

Figure 11:
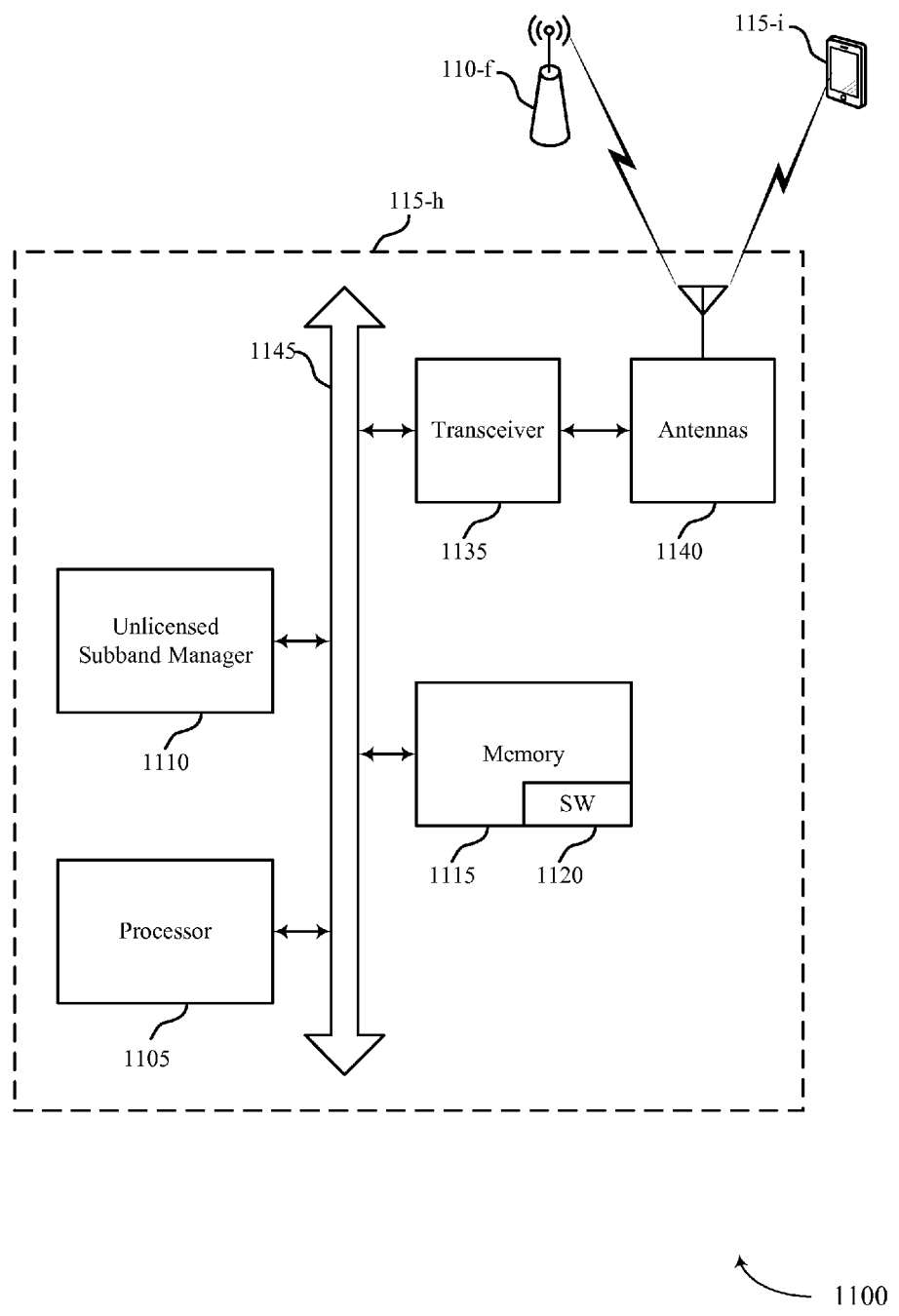
FIG. 11 illustrates a block diagram of a system including a user equipment (UE) that supports separation of control and data subbands in unlicensed spectrum in accordance with various aspects of the present disclosure.

FIG. 11 shows a diagram of a system 1100 including a STA 115-h configured for separation of control and data subbands in unlicensed spectrum in accordance with various aspects of the present disclosure. STA 115-h may be an example of a wireless device 800, a wireless device 900, or a STA 115 described with reference to FIGS. 1-10. STA 115-h may include an unlicensed subband manager 1110, which may be an example of an unlicensed subband manager 810 described with reference to FIGS. 8-10. STA 115-h may also include components for bi-directional voice and data communications including components for transmitting communications and components for receiving communications. For example, STA 115-h may communicate bi-directionally with STA 115-i or AP 110-f.

STA 115-h may also include a processor 1105, and memory 1115 (including software (SW) 1120), a transceiver 1135, and one or more antenna(s) 1140, each of which may communicate, directly or indirectly, with one another (e.g., via buses 1145). The transceiver 1135 may communicate bi-directionally, via the antenna(s) 1140 or wired or wireless links, with one or more networks, as described above. For example, the transceiver 1135 may communicate bi-directionally with an AP 110 or another STA 115. In some cases, the transceiver 1135 may communicate over separate control and data subbands. The transceiver 1135 may include a modem to modulate the packets and provide the modulated packets to the antenna(s) 1140 for transmission, and to demodulate packets received from the antenna(s) 1140. While STA 115-h may include a single antenna 1140, STA 115-*h* may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., separation of control and data subbands in unlicensed spectrum, etc.). Alternatively, the software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an application specific integrated circuit (ASIC), etc.).

Figure 12:
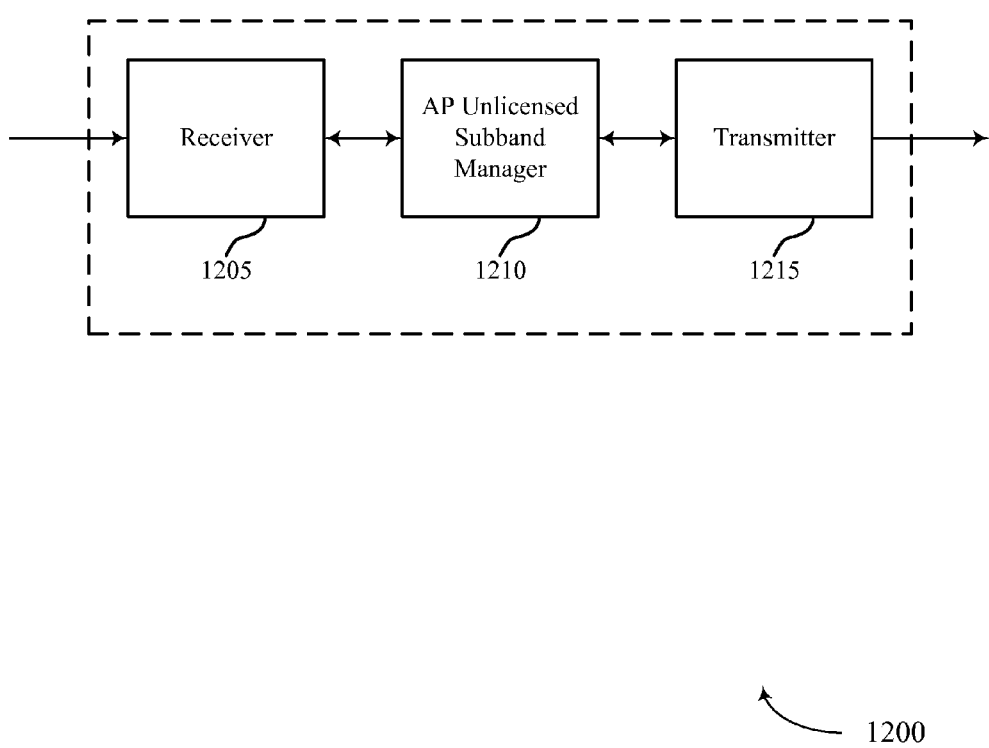
FIGS. 12-14 show block diagrams of a wireless device that supports separation of control and data subbands in unlicensed spectrum in accordance with various aspects of the present disclosure.

FIG. 12 shows a block diagram of a wireless device 1200 configured for separation of control and data subbands in unlicensed spectrum in accordance with various aspects of the present disclosure. Wireless device 1200 may be an example of aspects of an AP 110 described with reference to FIGS. 1-7. In some cases, wireless device 1200 may be an example of a central coordinator 140 described with reference to FIGS. 1-7. When serving as a central coordinator 140, wireless device 1200 may not participate in the transmission or reception of control and/or data signals; that is, wireless device 1200 may be responsible for subband reservation and refrain from other types of communication. Wireless device 1200 may include a receiver 1205, a AP unlicensed subband manager 1210, or a transmitter 1215. Wireless device 1200 may also include a processor. Each of these components may be in communication with each other.

The receiver 1205 may receive information such as packets, user data, or control information associated with various information channels. The information may be related to separation of control and data subbands in unlicensed spectrum. The receiver 1205 may receive control traffic over a control subband and data traffic over a data subband. The control subband and the data subband may be in the unlicensed radio frequency spectrum band. The receiver 1205 may receive enhanced self-CTSs over the separate control and data subbands. In some cases, the receiver 1205 may collaborate with other components of wireless device 1200 to support the separation of the control subband and the data subband. For example, information received by the receiver 1205 may be passed on to the AP unlicensed subband manager 1210.

The AP unlicensed subband manager 1210 may identify a first subband (e.g., a control subband) in an unlicensed radio frequency spectrum band used to communicate control traffic. The AP unlicensed subband manager 1210 may identify a second subband (e.g., a control subband) in the unlicensed radio frequency spectrum band used to communicate data traffic. The first subband and the second subband may be different (e.g., the first subband and the second subband may include have frequencies). The AP unlicensed subband manager 1210 may also reserve the first subband for a first duration of time for a number of wireless devices. The number of wireless devices may be in the same network as the wireless device 1200. The reservation of the first subband may be based at least in part on an enhanced self-CTS transmitted over the first subband.

The transmitter 1215 may transmit signals received from other components of wireless device 1200. For example, the transmitter 1215 may collaborate with the AP unlicensed subband manager 1210 to transmit enhanced self-CTSs. The transmitter 1215 may transmit signals over the first subband and the second subband. For example, the transmitter 1215 may transmit control traffic (e.g., CQI reports, traffic requests, etc.) over the first subband and data traffic over the second subband. In some examples, the transmitter 1215 may be collocated with the receiver 1205 in a transceiver module. The transmitter 1215 may include a single antenna, or it may include a plurality of antennas.

Figure 13:
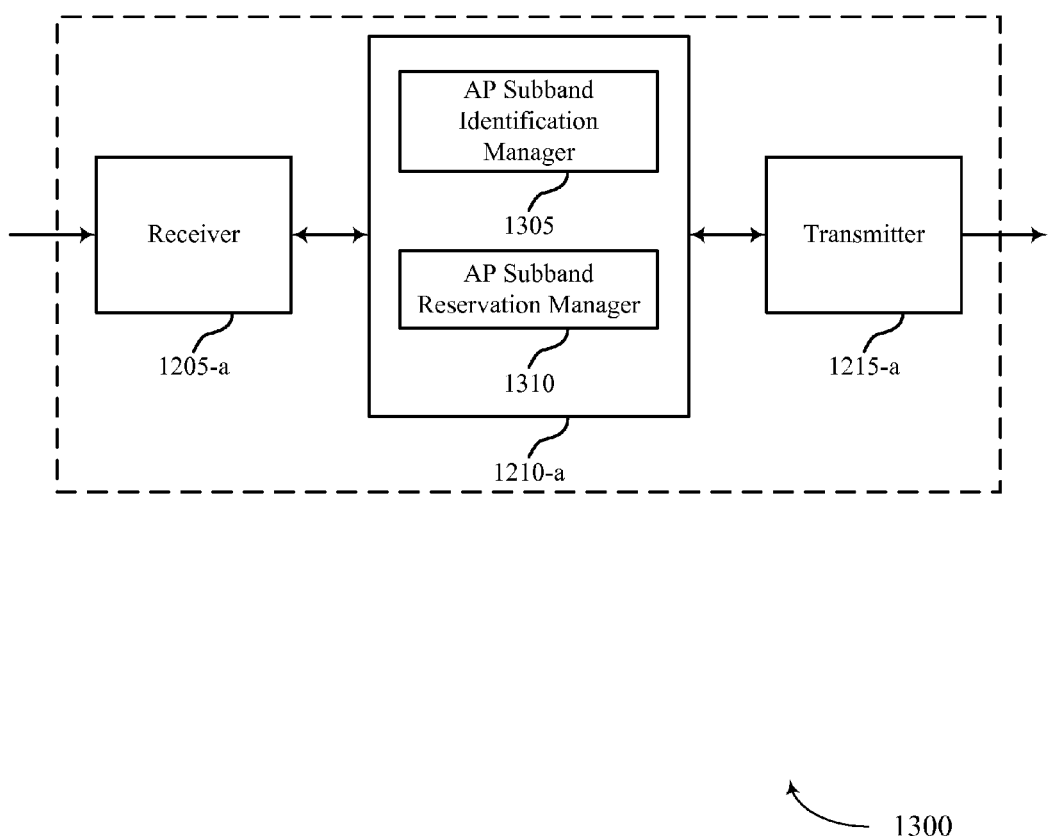

FIG. 13 shows a block diagram of a wireless device 1300 for separation of control and data subbands in unlicensed spectrum in accordance with various aspects of the present disclosure. Wireless device 1300 may be an example of aspects of a wireless device 1200 or an AP 110 described with reference to FIGS. 1-12. When the wireless device 1300 serves as an AP 110 the wireless device 1300 may participate in either a distributed subband reservation scheme or a centralized distributed subband scheme. In some cases, wireless device 1300 may be an example of a central coordinator 140 described with reference to FIGS. 1-12. When the wireless device 1300 serves as a central coordinator 140 the wireless device 1300 may participate in a centralized subband reservation scheme. Wireless device 1300 may include a receiver 1205-*a*, a AP unlicensed subband manager 1210-*a*, or a transmitter 1215-*a*. Wireless device 1300 may also include a processor. Each of these components may be in communication with each other. The AP unlicensed subband manager 1210-*a* may include a AP subband identification manager 1305 and a AP subband reservation manager 1310.

The receiver 1205-*a* may receive information (e.g., over separate control and data subbands) which may be passed on to AP unlicensed subband manager 1210-*a*, and to other components of wireless device 1300. The AP unlicensed subband manager 1210-*a* may perform the operations described with reference to FIG. 12. The transmitter 1215-*a* may transmit signals received from other components of wireless device 1300 (e.g., the transmitter 1215-*a* may transmit signals over separate control and data subbands).

The AP subband identification manager 1305 may identify a first subband (e.g., a control subband) in an unlicensed radio frequency spectrum band used to communicate control traffic. The AP subband identification manager 1305 may identify a second subband (e.g., a data subband) in the unlicensed radio frequency spectrum band used to communicate data traffic. The first subband and the second subband may be different as described with reference to FIGS. 1-7. In some examples, the first subband may be lower in frequency than the second subband and have a smaller bandwidth than the second subband (e.g., the bandwidth of the first subband may be at least ten times smaller than that of the second subband). In some examples, the first subband is in the sub 1 GHz range and the second subband is in the 2.4 GHz or 5 GHz band.

The AP subband reservation manager 1310 may reserve subbands using enhanced self-CTSs. For example, the AP subband reservation manager 1310 may reserve the first subband for a first duration of time for multiple wireless devices. The wireless devices may be in the same network as the wireless device 1300 and the reservation may be based at least in part on an enhanced self-CTS transmitted over the first subband as described with reference to FIGS. 2-7. In some examples, the enhanced self-CTS includes a network ID that corresponds to a network with which the wireless devices belong. The AP subband reservation manager 1310 may collaborate with the transmitter 1215-*a* to transmit enhanced self-CTSs. When the wireless device 1300 is an AP 110, the wireless device 1300 may be associated with control traffic transmitted over the first subband during the first duration of time. When the wireless device is a central coordinator 140, the wireless device 1300 may be unassociated with control traffic transmitted over the first subband during the first duration of time.

The components of wireless device 1200, wireless device 1300, and AP unlicensed subband manager 1210 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 14:
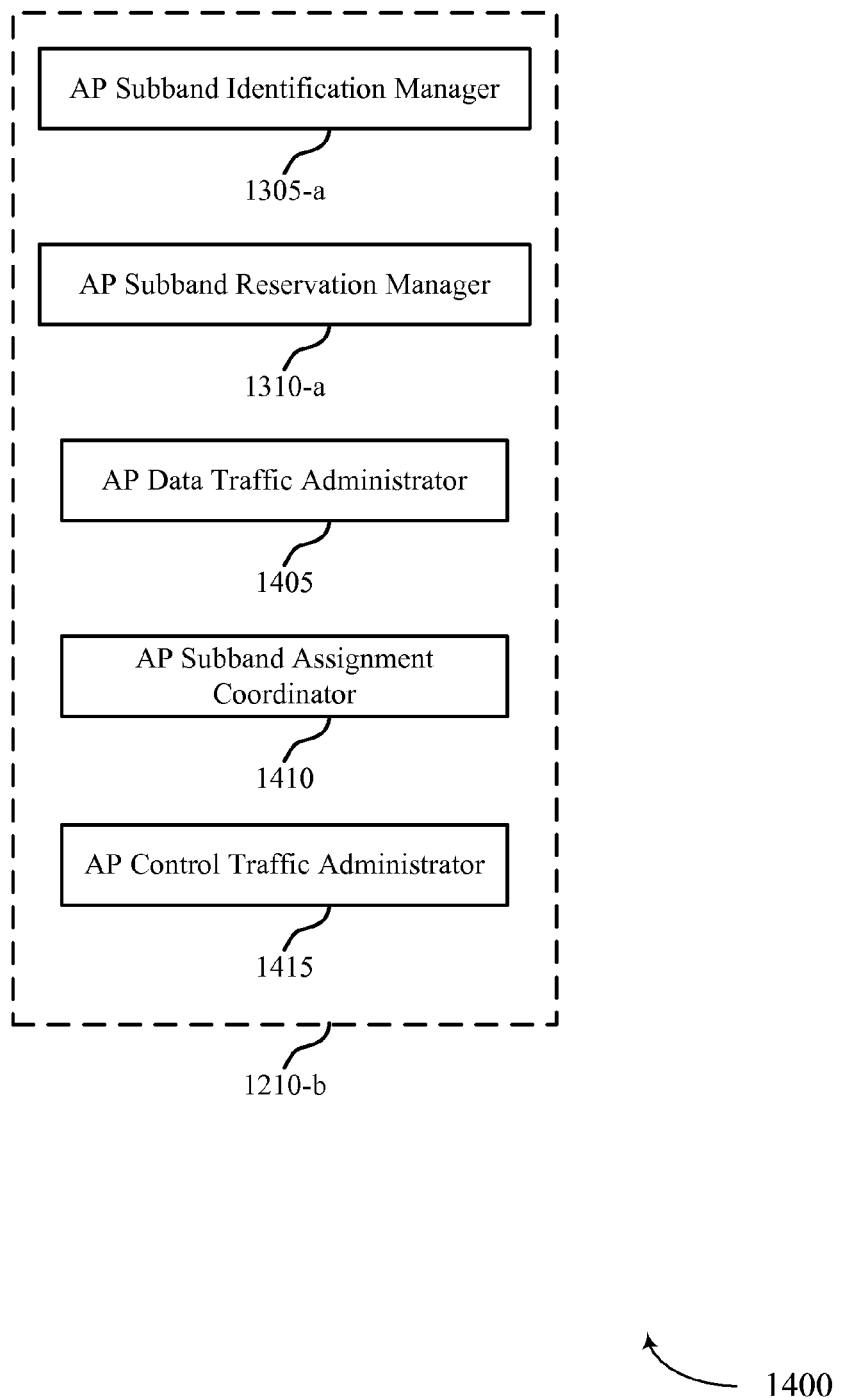

FIG. 14 shows a block diagram 1400 of a AP unlicensed subband manager 1210-b which may be a component of a wireless device 1200 or a wireless device 1300 for separation of control and data subbands in unlicensed spectrum in accordance with various aspects of the present disclosure. The AP unlicensed subband manager 1210-b may be an example of aspects of a AP unlicensed subband manager 1210 described with reference to FIGS. 12-13. The AP unlicensed subband manager 1210-b may include a AP subband identification manager 1305-a and a AP subband reservation manager 1310-a. Each of these modules may perform the functions described with reference to FIG. 13. The AP unlicensed subband manager 1210-b may also include a AP data traffic administrator 1405, a AP subband assignment coordinator 1410, and a AP control traffic administrator 1415.

The AP data traffic administrator 1405 may collaborate with a receiver 1205 to receive data traffic over the data subband. In one example, the AP data traffic administrator 1405 may receive data traffic over the data subband during a duration of time in which the data subband is reserved. The data subband may be reserved for multiple wireless devices in the same network by an enhanced self-CTS transmitted over the data subband as described with reference to FIGS. 2-7. The enhanced self-CTS may be sent by the wireless device or a STA 115. In some cases, the AP data traffic administrator 1405 may transmit data traffic over the data subband during a second duration of time in which the data subband is reserved. The data subband may be reserved for multiple wireless devices by a second enhanced self-CTS transmitted over the data subband. The second enhanced self-CTS may be transmitted by the wireless device or another wireless device in the network. The second enhanced self-CTS may be based on a subband assignment for the data subband that is sent over the control subband.

The AP subband assignment coordinator 1010 may collaborate with a transmitter 1215 to transmit subband assignments over the control subband. For example, the AP subband assignment coordinator 1410 may transmit a subband assignment for the data subband over the first subband. The transmission may occur during a duration of time in which the control channel is reserved for a number of wireless devices in the same network. In some cases the subband assignment is in response to a traffic request.

The AP control traffic administrator 1415 may collaborate with a receiver 1205 to receive control traffic over the control band. For example, the AP control traffic administrator 1415 may receive control traffic sent over the control subband by at least one of the wireless devices in the same network. In some cases, the control traffic include a traffic request and/or a CQI report. The control traffic may be received during a duration of time in which the control subband is reserved as described with reference to FIGS. 2-7. The control band may be reserved by an enhanced self-CTS sent over the control subband. In some cases, the AP control traffic administrator 1415 may collaborate with a transmitter 1215 to transmit control traffic over the control subband. For example, the AP control traffic administrator 1415 may facilitate the transmission of control traffic over the control subband during a period in which the control subband is reserved. In some examples, transmitting the control traffic includes transmitting the control traffic according to a random access scheme or a pre-determined round robin TDMA scheme.

Figure 15:
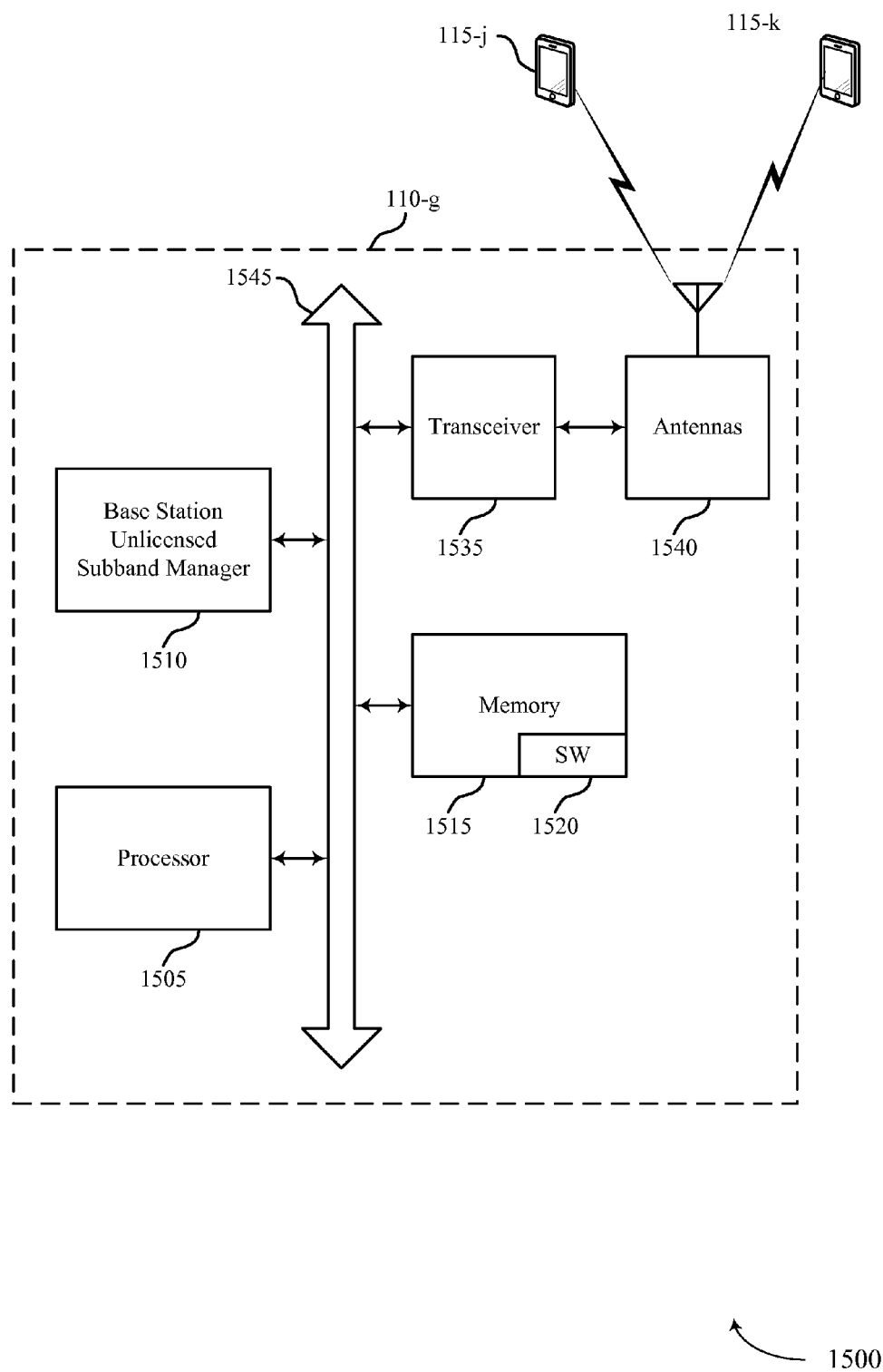
FIG. 15 illustrates a block diagram of a system including a base station that supports separation of control and data subbands in unlicensed spectrum in accordance with various aspects of the present disclosure.

FIG. 15 shows a diagram of a system 1500 including a AP 110 configured for separation of control and data subbands in unlicensed spectrum in accordance with various aspects of the present disclosure. System 1500 may include AP 110-g, which may be an example of a wireless device 1200, a wireless device 1300, a central coordinator 140, or an AP 110 described with reference to FIGS. 1, 2, and 12-14. AP 110-g may include a AP unlicensed subband manager 1510, which may be an example of a AP unlicensed subband manager 1210 described with reference to FIGS. 12-14. AP 110-g may also include components for bi-directional voice and data communications including components for transmitting communications and components for receiving communications. For example, AP 110-g may communicate bi-directionally with STA 115-j or STA 115-k.

The AP 110-g may include a processor 1505, memory 1515 (including software (SW) 1520), transceiver 1535, and antenna(s) 1540, which each may be in communication, directly or indirectly, with one another (e.g., over bus system 1545). The transceiver 1535 may be configured to communicate bi-directionally, via the antenna(s) 1540, with the STAs 115, which may be multi-mode devices. The transceiver 1535 (or other components of the AP 110-g) may also be configured to communicate bi-directionally, via the antennas 1540, with one or more other APs (not shown). The transceiver 1535 may include a modem configured to modulate the packets and provide the modulated packets to the antennas 1540 for transmission, and to demodulate packets received from the antennas 1540. The AP 110-g may include multiple transceivers 1535, each with one or more associated antennas 1540. The transceiver may be an example of a combined receiver 1205 and transmitter 1215 of FIG. 12.

The memory 1515 may include RAM and ROM. The memory 1515 may also store computer-readable, computer-executable software code 1520 containing instructions that are configured to, when executed, cause the processor 1505 to perform various functions described herein (e.g., separation of control and data subbands in unlicensed spectrum, selecting coverage enhancement techniques, call processing, database management, message routing, etc.). Alternatively, the software 1520 may not be directly executable by the processor 1505 but be configured to cause the computer (e.g., when compiled and executed) to perform functions described herein. The processor 1505 may include an intelligent hardware device (e.g., a CPU, a microcontroller, an ASIC, etc.). The processor 1505 may include various special purpose processors such as encoders, queue processing modules, base band processors, radio head controllers, digital signal processor (DSPs), and the like.

Figure 16:
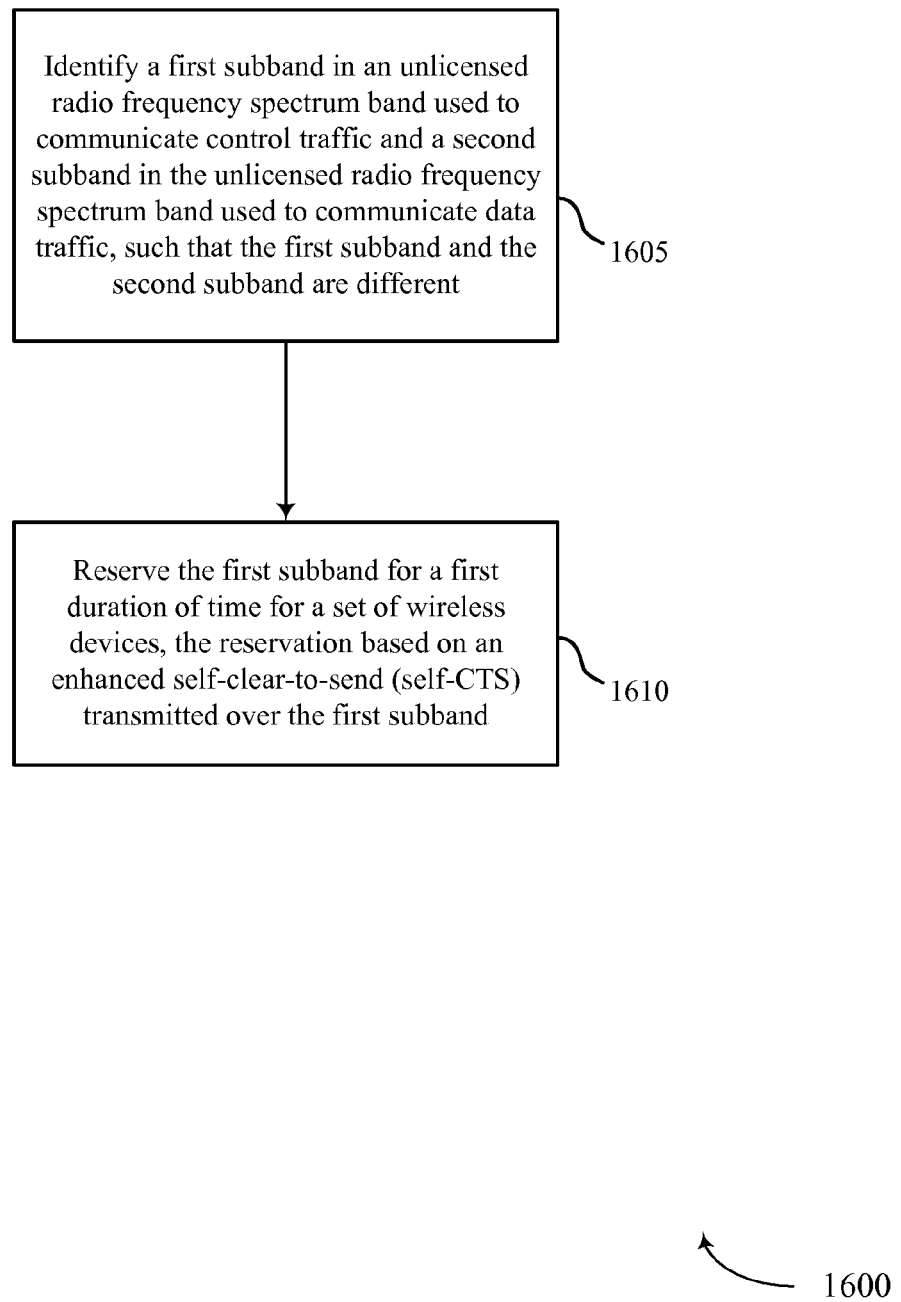
FIGS. 16-19 illustrate methods for separation of control and data subbands in unlicensed spectrum in accordance with various aspects of the present disclosure.

FIG. 16 shows a flowchart illustrating a method 1600 for separation of control and data subbands in unlicensed spectrum in accordance with various aspects of the present disclosure. The operations of method 1600 may be implemented by a wireless devices such as a STA 115, AP 110, or central coordinator 140, or its components as described with reference to FIGS. 1-15. For example, the operations of method 1600 may be performed or facilitated by the unlicensed subband manager 810 as described with reference to FIGS. 8-11, or by the AP unlicensed subband manager 1210 described with reference to FIGS. 12-15. In some examples, a wireless device may execute a set of codes to control the functional elements of the wireless device to perform the functions described below. Additionally or alternatively, the wireless device may perform aspects the functions described below using special-purpose hardware.

At block 1605, the wireless device may identify a first subband (e.g., a control subband) in an unlicensed radio frequency spectrum band used to communicate control traffic and a second subband (e.g., a data subband) in the unlicensed radio frequency spectrum band used to communicate data traffic. The first subband and the second subband may be different as described with reference to FIGS. 2-7. In certain examples, the operations of block 1605 may be performed or facilitated by the subband identification manager 905 as described with reference to FIG. 9. In certain examples, the operations of block 1605 may be performed or facilitated by the AP subband identification manager 1305 as described with reference to FIG. 13.

At block 1610, the wireless device may reserve the first subband for a first duration of time for a set of wireless devices. The reservation may be based at least in part on an enhanced self-CTS transmitted over the first subband as described with reference to FIGS. 2-7. In certain examples, the operations of block 1610 may be performed or facilitated by the subband reservation manager 910 as described with reference to FIG. 9. In certain examples, the operations of block 1610 may be performed or facilitated by the AP subband reservation manager 1310 as described with reference to FIG. 13.

Figure 17:
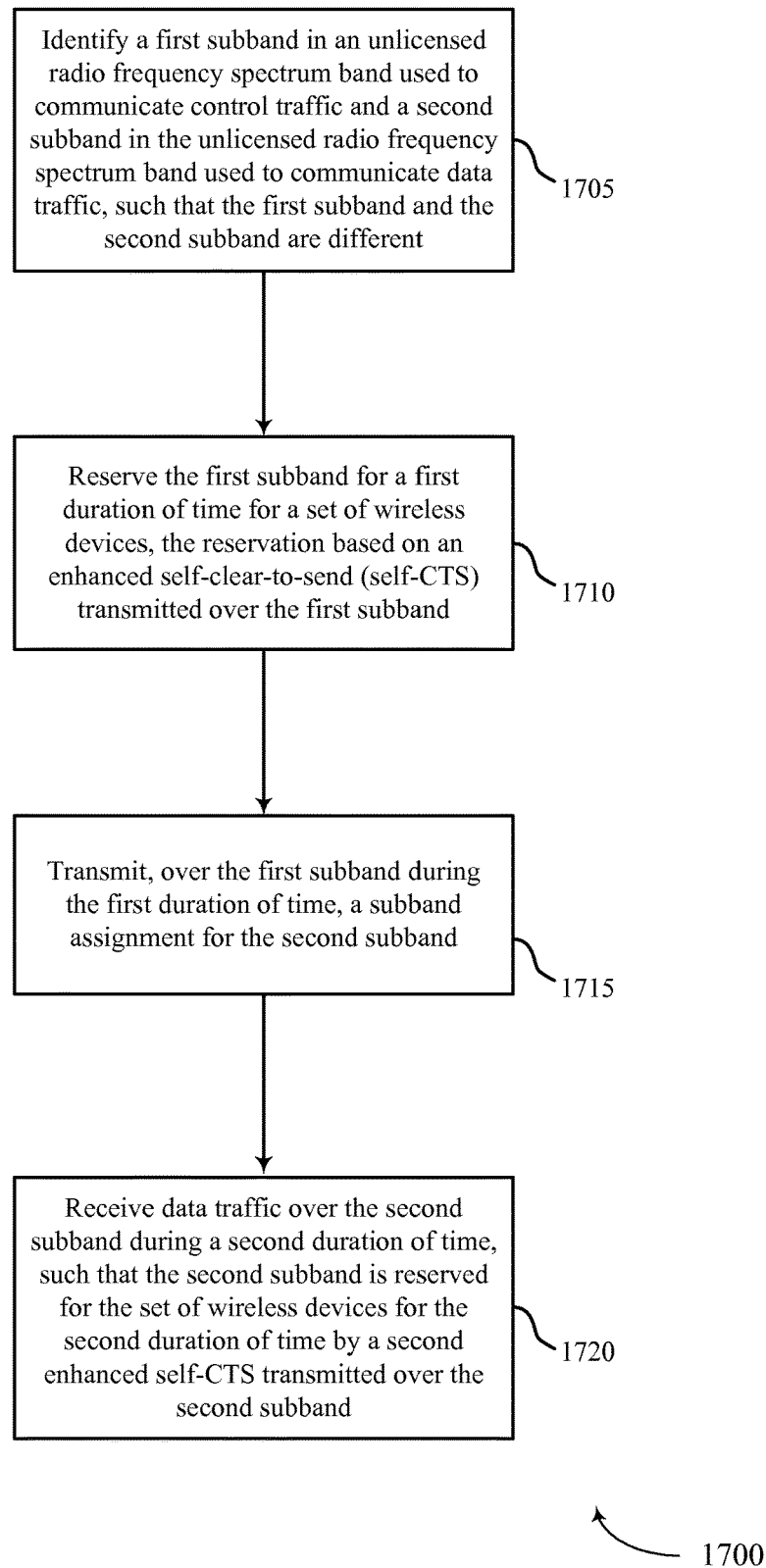

FIG. 17 shows a flowchart illustrating a method 1700 for separation of control and data subbands in unlicensed spectrum in accordance with various aspects of the present disclosure. The operations of method 1700 may be implemented by a wireless device such as an AP 110 its components as described with reference to FIGS. 1-15. For example, the operations of method 1700 may be performed by the AP unlicensed subband manager 1210 described with reference to FIGS. 12-15. In some examples, an AP 110 may execute a set of codes to control the functional elements of the AP 110 to perform the functions described below. Additionally or alternatively, the AP 110 may perform aspects the functions described below using special-purpose hardware. The method 1700 may also incorporate aspects of method 1600 of FIG. 16.

At block 1705, the AP 110 may identify a first subband (e.g., a control subband) in an unlicensed radio frequency spectrum band used to communicate control traffic and a second subband (e.g., a data subband) in the unlicensed radio frequency spectrum band used to communicate data traffic. The first subband and the second subband may be different as described with reference to FIGS. 2-7. In one example the first subband is sub 1 GHz band and the second subband is in a 2.4 GHz or 5 GHz band. In certain examples, the operations of block 1705 may be performed or facilitated by the AP subband identification manager 1305 as described with reference to FIG. 13. At block 1710, the AP 110 may reserve the first subband for a first duration of time for a set of wireless devices. The set of wireless devices may be in the same network as the AP 110. The reservation may be based at least in part on an enhanced self-CTS transmitted over the first subband as described with reference to FIGS. 2-7. In certain examples, the operations of block 1710 may be performed or facilitated by the subband reservation manager 1310 as described with reference to FIG. 13.

At block 1715, the AP 110 may transmit, over the first subband during the first duration of time, a subband assignment for the second subband as described with reference to FIGS. 2-7. In certain examples, the operations of block 1715 may be performed or facilitated by the AP subband assignment coordinator 1410 as described with reference to FIG. 14. At block 1720, the AP 110 may receive data traffic over the second subband during a second duration of time, wherein the second subband is reserved for the plurality of wireless devices for the second duration of time by a second enhanced self-CTS transmitted over the second subband as described with reference to FIGS. 2-7. The second enhanced self-CTS may be based at least in part on the subband assignment. In certain examples, the operations of block 1720 may be performed or facilitated by the AP data traffic administrator 1405 as described with reference to FIG. 14.

Figure 18:
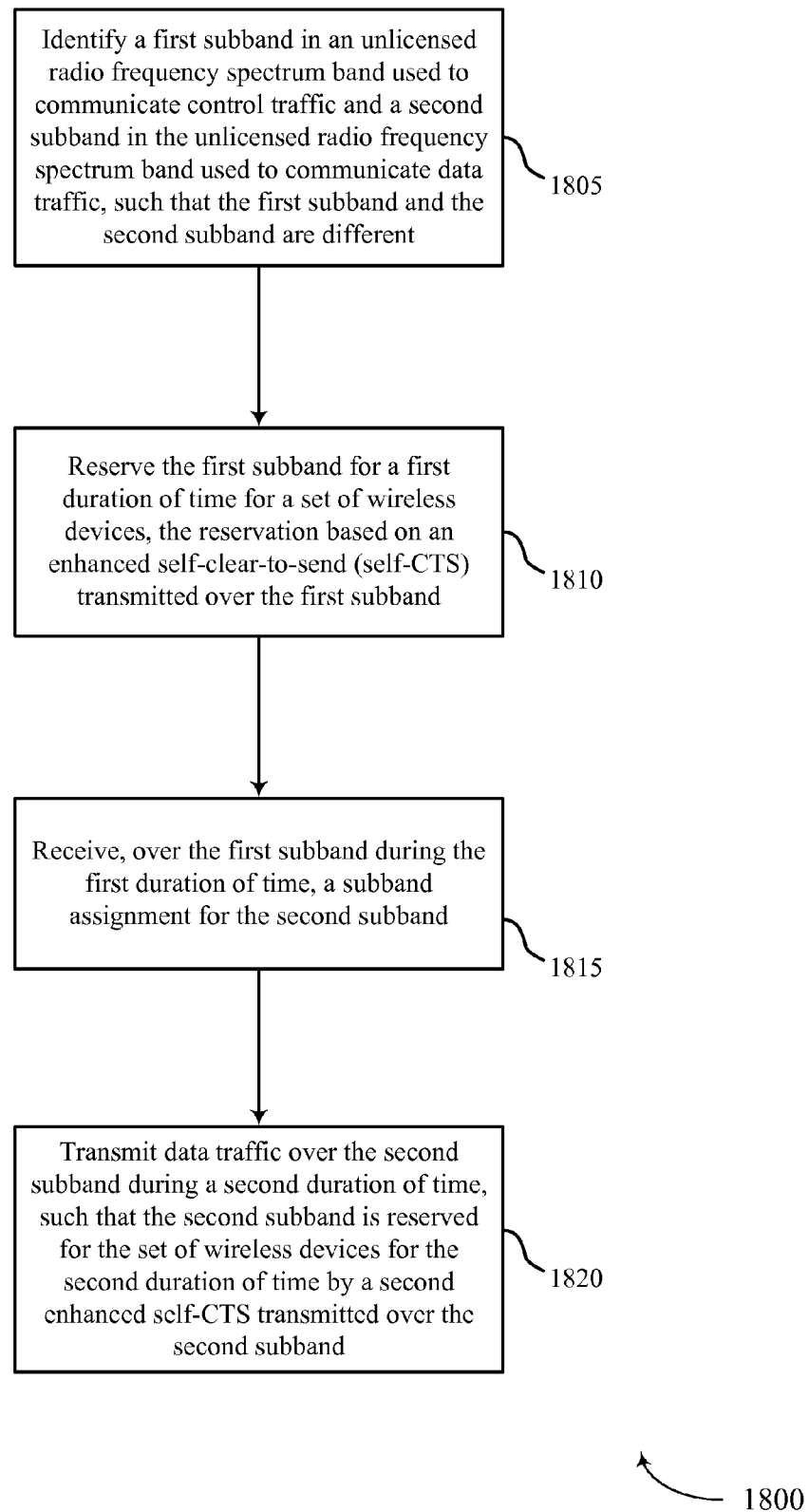

FIG. 18 shows a flowchart illustrating a method 1800 for separation of control and data subbands in unlicensed spectrum in accordance with various aspects of the present disclosure. The operations of method 1800 may be implemented by a STA 115 or its components as described with reference to FIGS. 1-11. For example, the operations of method 1800 may be performed by the unlicensed subband manager 810 as described with reference to FIGS. 8-11. In some examples, a STA 115 may execute a set of codes to control the functional elements of the STA 115 to perform the functions described below. Additionally or alternatively, the STA 115 may perform aspects the functions described below using special-purpose hardware. The method 1800 may also incorporate aspects of methods 1600, and 1700 of FIGS. 16-17.

At block 1805, the STA 115 may identify a first subband (e.g., a control subband) in an unlicensed radio frequency spectrum band used to communicate control traffic. The STA 115 may also identify a second subband (e.g., a data subband) in the unlicensed radio frequency spectrum band used to communicate data traffic. The first subband may have a smaller bandwidth that that of the second bandwidth. In certain examples, the operations of block 1805 may be performed or facilitated by the subband identification manager 905 as described with reference to FIG. 9. At block 1810, the STA 115 may reserve the first subband for a first duration of time for a set of wireless devices. The reservation may be based at least in part on an enhanced self-CTS transmitted over the first subband as described with reference to FIGS. 2-7. In certain examples, the operations of block 1810 may be performed or facilitated by the subband reservation manager 910 as described with reference to FIG. 9.

At block 1815, the STA 115 may receive, over the first subband during the first duration of time, a subband assignment for the second subband, as described with reference to FIGS. 2-7. In certain examples, the operations of block 1815 may be performed or facilitated by the subband assignment coordinator 1010 as described with reference to FIG. 10. At block 1820, the STA 115 may transmit data traffic over the second subband during a second duration of time. The second subband may be reserved for the plurality of wireless devices for the second duration of time by a second enhanced self-CTS transmitted over the second subband as described with reference to FIGS. 2-7. In some cases, the second enhanced self-CTS is based at least in part on the subband assignment. In certain examples, the operations of block 1820 may be performed or facilitated by the data traffic administrator 1005 as described with reference to FIG. 10.

Figure 19:
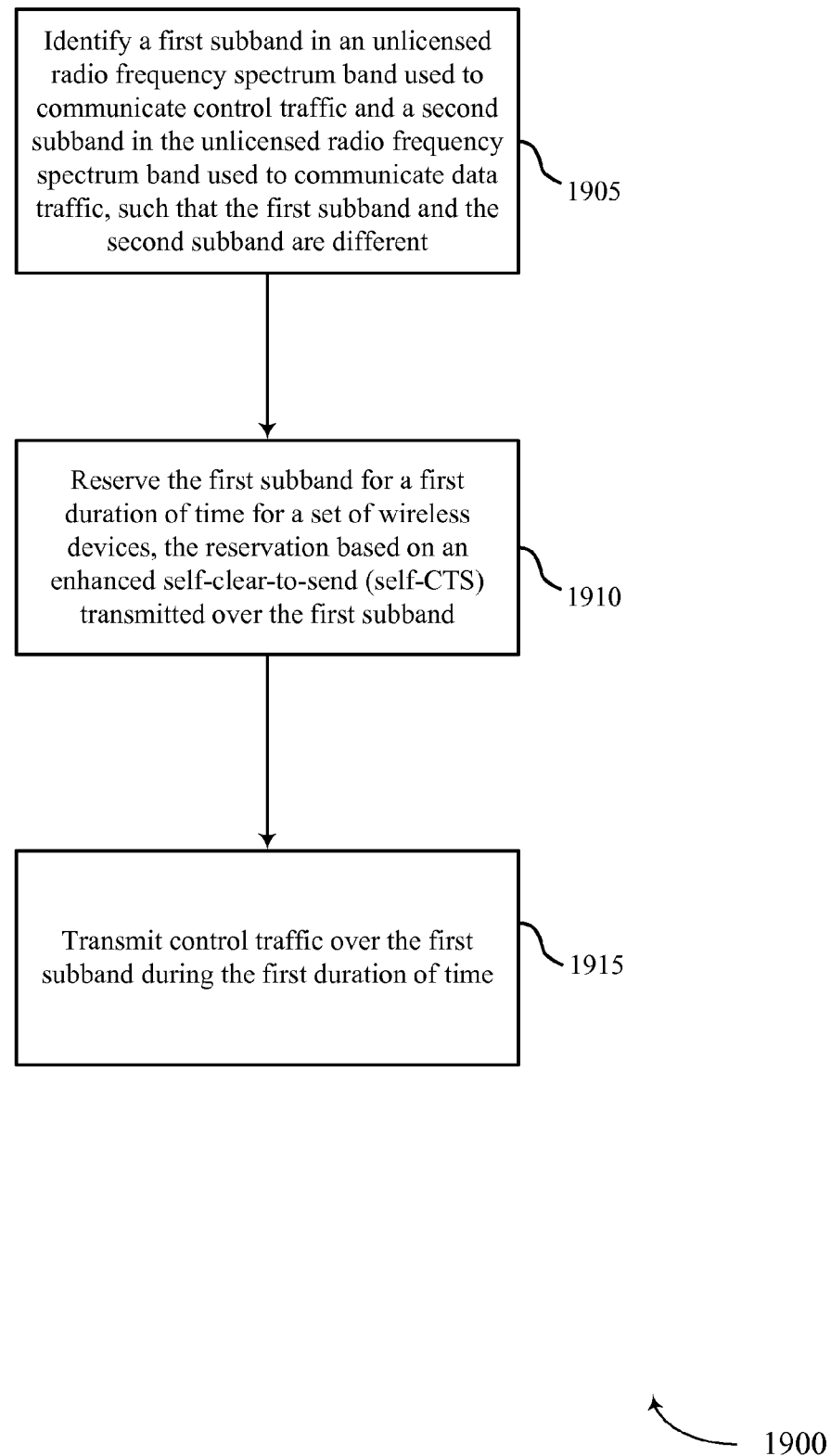

FIG. 19 shows a flowchart illustrating a method 1900 for separation of control and data subbands in unlicensed spectrum in accordance with various aspects of the present disclosure. The operations of method 1900 may be implemented by a STA 115 or its components as described with reference to FIGS. 1-15. For example, the operations of method 1900 may be performed by the unlicensed subband manager 810 as described with reference to FIGS. 8-11. In some examples, a STA 115 may execute a set of codes to control the functional elements of the STA 115 to perform the functions described below. Additionally or alternatively, the STA 115 may perform aspects the functions described below using special-purpose hardware. The method 1900 may also incorporate aspects of methods 1600, 1700, and 1800 of FIGS. 16-18.

At block 1905, the STA 115 may identify a first subband (e.g., a control subband) in an unlicensed radio frequency spectrum band used to communicate control traffic. The STA 115 may also identify a second subband (e.g., a data subband) in the unlicensed radio frequency spectrum band used to communicate data traffic. The first subband may be lower in frequency that the second subband. In certain examples, the operations of block 1905 may be performed or facilitated by the subband identification manager 905 as described with reference to FIG. 9.

At block 1910, the STA 115 may reserve the first subband for a first duration of time for a plurality of wireless devices. The reservation may be based at least in part on an enhanced self-CTS transmitted over the first subband as described with reference to FIGS. 2-7. In some cases, the reservation may be made by a wireless device other that the STA 115. In such a case, the STA 115 may detect the network ID included in the enhanced self-CTS and determine that the first subband is accessible during the reservation period. In certain examples, the operations of block 1910 may be performed or facilitated by the subband reservation manager 910 as described with reference to FIG. 9.

At block 1915, the STA 115 may transmit control traffic over the first subband during the first duration of time as described with reference to FIGS. 2-7. In some cases, STA 115 transmits the control traffic according to a random access scheme (e.g., CSMA) or predetermined round robin access scheme (e.g., TDMA). The control traffic may include a CQI report and/or a traffic request. In some cases, the control traffic may be transmitted according to a subband assignment received by the STA 115. In certain examples, the operations of block 1915 may be performed or facilitated by the control traffic administrator 1015 as described with reference to FIG. 10.

Thus, methods 1600, 1700, 1800, and 1900 may provide for separation of control and data subbands in unlicensed spectrum. It should be noted that methods 1600, 1700, 1800, and 1900 describe possible implementation, and that the operations and the steps may be rearranged or otherwise modified such that other implementations are possible. In some examples, aspects from two or more of the methods 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
identifying, by a first device, a first subband in an unlicensed radio frequency spectrum band and a second subband in the unlicensed radio frequency spectrum band, wherein the first subband and the second subband are different;
reserving, by the first device, the first subband for a first duration of time for communication of control traffic between at least a second device and a third device, wherein the first subband is reserved by a first self-clear-to-send (self-CTS) transmitted over the first subband by the first device; and
refraining from transmitting over the second subband during a second duration of time reserved by a second self-CTS received from the second device or the third device, wherein the second subband is reserved for communication of data traffic between at least the second and third device.

2. The method of claim 1, further comprising:
receiving data traffic over the second subband during the second duration of time.

3. The method of claim 1, further comprising:
transmitting, over the first subband during the first duration of time, a subband assignment for the second subband, wherein the second self-CTS is based at least in part on the subband assignment.

4. The method of claim 1, further comprising:
transmitting data traffic over the second subband during a third duration of time, wherein the second subband is reserved for the third duration of time by a third self-CTS transmitted over the second subband by the first device.

5. The method of claim 1, further comprising:
receiving, over the first subband during the first duration of time, a subband assignment for the second subband.

6. The method of claim 1, further comprising:
receiving control traffic over the first subband by at least one of the second device and the third device during the first duration of time.

7. The method of claim 6, wherein the control traffic comprises at least one of a traffic request or a channel quality indicator (CQI) report.

8. The method of claim 1, further comprising:
transmitting control traffic over the first subband to at least one of the second device and the third device during the first duration of time.

9. The method of claim 8, wherein transmitting the control traffic comprises:
transmitting the control traffic according to a random access scheme or a pre-determined round robin time division multiple access (TDMA) scheme.

10. The method of claim 1, wherein the first device comprises a wireless device associated with control traffic transmitted over the first subband during the first duration of time.

11. The method of claim 1, wherein the first device comprises a central coordinator and further comprising:
refraining, by the first device, from using the first subband during the reserved first duration of time.

12. The method of claim 1, wherein the first self-CTS comprises a network identifier (ID) that corresponds to a network with which the second device and the third device belong.

13. The method of claim 1, wherein the first subband is lower in frequency than the second subband and comprises a smaller bandwidth than the second subband.

14. The method of claim 1, wherein the first subband comprises a frequency that is in a sub 1 GHz range and the second subband comprises a frequency that is in a 2.4 GHz or 5 GHz band, and a bandwidth of the second subband is at least ten times larger than the first subband.

15. A first apparatus for wireless communication, comprising:
a processor;
memory in electronic communication with the processor; and
instructions stored in the memory and operable, when executed by the processor, to cause the apparatus to:
identify a first subband in an unlicensed radio frequency spectrum band and a second subband in the unlicensed radio frequency spectrum band, wherein the first subband and the second subband are different; and
reserve the first subband for a first duration of time for communication of control traffic between at least a second apparatus and a third apparatus, wherein the first subband is reserved by a first self-clear-to-send (self-CTS) transmitted over the first subband by the first apparatus; and
refrain from transmitting over the second subband during a second duration of time reserved by a second self- CTS received from the second apparatus or the third apparatus, wherein the second subband is reserved for communication of data traffic between at least the second and third apparatus.

16. The first apparatus of claim 15, wherein the instructions are operable to cause the first apparatus to:
receive data traffic over the second subband during the second duration of time.

17. The first apparatus of claim 15, wherein the instructions are operable to cause the first apparatus to:
transmit, over the first subband during the first duration of time, a subband assignment for the second subband, wherein the second self-CTS is based at least in part on the subband assignment.

18. The first apparatus of claim 15, wherein the instructions are operable to cause the first apparatus to:
transmit data traffic over the second subband during a third duration of time, wherein the second subband is reserved for the third duration of time by a third self-CTS transmitted over the second subband by the first apparatus.

19. The first apparatus of claim 15, wherein the instructions are operable to cause the first apparatus to:
receive, over the first subband during the first duration of time, a subband assignment for the second subband.

20. The first apparatus of claim 15, wherein the instructions are operable to cause the first apparatus to:
receive control traffic over the first subband by at least one of the second apparatus and third apparatus during the first duration of time.

21. The first apparatus of claim 15, wherein the instructions are operable to cause the first apparatus to:
transmit control traffic over the first subband to at least one of the second apparatus and third apparatus during the first duration of time.

22. The first apparatus of claim 21, wherein transmitting the control traffic comprises:
transmitting the control traffic according to a random access scheme or a pre-determined round robin time division multiple access (TDMA) scheme.

23. The first apparatus of claim 15, wherein the first apparatus comprises a wireless device associated with control traffic transmitted over the first subband during the first duration of time.

24. A first apparatus for wireless communication, comprising:
means for identifying a first subband in an unlicensed radio frequency spectrum band and a second subband in the unlicensed radio frequency spectrum band, wherein the first subband and the second subband are different;
means for reserving the first subband for a first duration of time for communication of control traffic between at least a second apparatus and a third apparatus, wherein the first subband is reserved by a first self-clear-to-send (self-CTS) transmitted over the first subband by the first apparatus; and
refrain from transmitting over the second subband during a second duration of time reserved by a second self-CTS received from the second apparatus or the third apparatus, wherein the second subband is reserved for communication of data traffic between at least the second and third apparatus.

25. The first apparatus of claim 24, further comprising:
means for receiving data traffic over the second subband during the second duration of time.

26. The first apparatus of claim 24, further comprising:
means for transmitting, over the first subband during the first duration of time, a subband assignment for the second subband, wherein the second self-CTS is based at least in part on the subband assignment.

27. The first apparatus of claim 24, further comprising:
means for transmitting data traffic over the second subband during a third duration of time, wherein the second subband is reserved for the third duration of time by a third self-CTS transmitted over the second subband.

28. The first apparatus of claim 27, further comprising:
means for receiving, over the first subband during the first duration of time, a subband assignment for the second subband.

29. The first apparatus of claim 24, further comprising:
means for receiving control traffic over the first subband by at least one of the second apparatus and third apparatus during the first duration of time.

30. A non-transitory computer-readable medium storing code for wireless communication, the code comprising instructions executable to:
identify, by a first device, a first subband in an unlicensed radio frequency spectrum band and a second subband in the unlicensed radio frequency spectrum band, wherein the first subband and the second subband are different;
reserve, by the first device, the first subband for a first duration of time for communication of control traffic between at least a second device and a third device, wherein the first subband is reserved by a first self-clear-to-send (self-CTS) transmitted over the first subband by the first device; and
refrain from transmitting over the second subband during a second duration of time reserved by a second self-CTS received from the second device or the third device, wherein the second subband is reserved for communication of data traffic between at least the second and third device.

* * * * *